(12) United States Patent
Walther et al.

(10) Patent No.: US 9,984,164 B2
(45) Date of Patent: May 29, 2018

(54) SEARCH SYSTEMS AND METHODS WITH INTEGRATION OF AGGREGATE USER ANNOTATIONS

(75) Inventors: Eckart Walther, Palo Alto, CA (US); Qi Lu, Saratoga, CA (US); David Ku, Palo Alto, CA (US); Kevin Lee, East Palo Alto, CA (US); Chung-Man Tam, San Francisco, CA (US); Ali Diab, Menlo Park, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 0 days. days.

(21) Appl. No.: 13/192,805

(22) Filed: Jul. 28, 2011

(65) Prior Publication Data

US 2012/0233154 A1 Sep. 13, 2012

Related U.S. Application Data

(63) Continuation of application No. 11/082,212, filed on Mar. 15, 2005, now Pat. No. 8,005,835.

(60) Provisional application No. 60/553,607, filed on Mar. 15, 2004, provisional application No. 60/614,232, filed on Sep. 28, 2004.

(51) Int. Cl.
 *G06F 17/30* (2006.01)

(52) U.S. Cl.
 CPC .. *G06F 17/30867* (2013.01); *G06F 17/30696* (2013.01); *G06F 17/30864* (2013.01); *G06F 17/30882* (2013.01); *G06F 17/30935* (2013.01); *Y10S 707/99942* (2013.01);
(Continued)

(58) Field of Classification Search
 None
 See application file for complete search history.

(56) References Cited

U.S. PATENT DOCUMENTS

| 5,392,428 A | 2/1995 | Robins |
| 6,181,336 B1 | 1/2001 | Chui et al. |

(Continued)

FOREIGN PATENT DOCUMENTS

| JP | 10-254886 | 9/1998 |
| JP | 2000148778 A | 5/2000 |

(Continued)

OTHER PUBLICATIONS

Japanese Patent Office Action dated Apr. 2, 2013 corresponding to Japanese Serial No. 2011-127561.

(Continued)

*Primary Examiner* — Alicia Willoughby
(74) *Attorney, Agent, or Firm* — Pillsbury Winthrop Shaw Pittman LLP

(57) ABSTRACT

Computer systems and methods allow users to annotate content items found in a corpus such as the World Wide Web. Annotations, which can include any descriptive and/or evaluative metadata related to a document, are collected from a user and stored in association with that user. Users are able to annotate and view their annotations for any document they encounter while interacting with the corpus, including hits returned in a search of the corpus. Users are also able to search their annotations or to limit searches to documents they have annotated. Metadata from annotations can also be aggregated across users and aggregated metadata applied in generating search results.

18 Claims, 15 Drawing Sheets

(52) U.S. Cl.
CPC .................. *Y10S 707/99943* (2013.01); *Y10S 707/99944* (2013.01); *Y10S 707/99945* (2013.01)

(56) References Cited

U.S. PATENT DOCUMENTS

| | | | |
|---|---|---|---|
| 6,480,837 B1 | 11/2002 | Dutta | |
| 6,675,213 B1 | 1/2004 | Schmonsees | |
| 6,832,218 B1 | 12/2004 | Emens et al. | |
| 7,730,054 B1* | 6/2010 | Marmaros | G06F 17/30867 707/713 |
| 7,971,217 B2 | 6/2011 | Masumitsu et al. | |
| 8,005,850 B2 | 8/2011 | Walther | |
| 8,327,260 B2 | 12/2012 | Bays et al. | |
| 2002/0042821 A1 | 4/2002 | Muret | |
| 2002/0049738 A1 | 4/2002 | Epstein | |
| 2002/0069218 A1* | 6/2002 | Sull et al. | 707/501.1 |
| 2003/0028585 A1 | 2/2003 | Yeager | |
| 2003/0149612 A1 | 8/2003 | Berghofer | |
| 2003/0187837 A1* | 10/2003 | Culliss | 707/3 |
| 2004/0003096 A1* | 1/2004 | Willis | 709/228 |
| 2004/0034652 A1* | 2/2004 | Hofmann et al. | 707/102 |
| 2004/0148281 A1* | 7/2004 | Bates et al. | 707/3 |
| 2004/0205065 A1 | 10/2004 | Petras | |
| 2004/0210602 A1* | 10/2004 | Hillis | G06F 17/3089 |
| 2005/0033803 A1 | 2/2005 | Vleet | |
| 2005/0055628 A1* | 3/2005 | Chen et al. | 715/512 |
| 2005/0071328 A1 | 3/2005 | Lawrence | |
| 2005/0081159 A1 | 4/2005 | Gupta et al. | |
| 2005/0102282 A1 | 5/2005 | Linden | |
| 2005/0125307 A1 | 6/2005 | Hunt et al. | |
| 2005/0131866 A1* | 6/2005 | Badros et al. | 707/3 |
| 2005/0165742 A1 | 7/2005 | Chin | |
| 2008/0114756 A1* | 5/2008 | Konig et al. | 707/5 |
| 2008/0195495 A1 | 8/2008 | Rubin et al. | |
| 2010/0063971 A1 | 3/2010 | Cragun et al. | |
| 2011/0153599 A1* | 6/2011 | Hillis et al. | 707/723 |
| 2011/0208711 A1* | 8/2011 | Van Vleet et al. | 707/706 |
| 2012/0011137 A1 | 1/2012 | Sheha | |
| 2013/0254811 A1 | 9/2013 | Ali et al. | |

FOREIGN PATENT DOCUMENTS

| | | |
|---|---|---|
| JP | 2002-259720 A | 9/2002 |
| JP | 2002-288206 | 10/2002 |
| JP | 2003-281179 | 10/2003 |
| JP | 2004-013323 | 1/2004 |
| WO | 2002-046961 | 6/2002 |

OTHER PUBLICATIONS

South Korean Office Action corresponding to South Korean Serial No. 10-2011-7031294 dated May 9, 2013.
Renda, M. et al., "A Personalized Collaborative Digital Library Environment", Proceedings of the 5th Intl. Conference on ALD, 2002, pp. 262-274.
RB Almeida and VAF Almeida, A Community-Aware Search Enginee in Proceedings of the 13th International Conference on World Wide Web, pp. 413-421, 2004.
"Dude, Check This Out!" downloaded from the internet at http://www.dudecheckthisout.com/index.aspx on Mar. 10, 2004.
"Dude, Check This Out! User Guide" downloaded from the internet at http://www.dudecheckthisout.com/user-guide.aspx on Mar. 10, 2004.
"How Eurekster Works" downloaded from the internet at http://home.eurekster.com/howitworks.htm on Mar. 10, 2004.
"Stumbleupon, What is Stumbleupon?" downloaded from the internet at http://www.stumbleupon.com/what.html on Mar. 10, 2004.
"Stumbleupon, How does it work?" downloaded from the internet at http://www.stumbleupon.com/how.html on Mar. 10, 2004.
Ginsburg M, Kambil A, "Annotate: a Web-based knowledge management support system for document collections", Systems Sciences, 1999, HICSS-32, Proceedings of the 32nd Annual Hawaii International Conference on Maui, HI, USA, Jan. 5-8, 1999.
Office Action dated Jun. 19, 2014 in U.S. Appl. No. 14/143,373.
Office Action dated Sep. 10, 2014 in U.S. Appl. No. 13/104,569.
Davies N J, et al., "Information Agents for the World Wide Web", BT Technology Journal, Springer, Dordrecht, NL, vol. 14, No. 4, Oct. 1, 1996, pp. 105-114.
Office Action dated Jan. 15, 2015 in U.S. Appl. No. 13/104,569.
Office Action dated Mar. 16, 2015 in U.S. Appl. No. 14/143,373.
Office Action dated Aug. 25, 2014 in Japanese Application No. 2013-257047.
Office Action dated Jul. 14, 2015 in U.S. Appl. No. 13/104,569.
Office Action dated Sep. 24, 2015 in U.S. Appl. No. 14/143,373.
Office Action dated Jun. 16, 2016 in U.S. Appl. No. 14/143,373.
Notice of Allowance dated Jun. 17, 2016 in U.S. Appl. No. 13/104,569.

* cited by examiner

Search Results  ← 1002

Search  | chinese food sunnyvale | [Submit]

The Best and the worst of CA
... Decent (and cheap) Chinese food. ~~~~~~ on South Main street in Yreka, CA ... Decent, but expensive Chinese food. ~~~~~~~ in Sunnyvale on El Camino Real, CA ...
http://www.somedomain.tld/pagewhatever.htm Rate This: [👍] [none] [👎]   ←— 1000

1004   1006   1008 low carb chinese food Resources
Your Low Carb. Web Directory and Resources. Sponsored Links. One low carb diet plan that always works. Have diets failed you in the past? ... ~~~~~~~.com - Authentic & healthy Chinese food cooking recipes. Over 500+ FREE low carb low fat ...
http://www.somedomain2.tld/dir2/thispageiscool.htm Rate This: [👍] [none] [👎]

Chinese Food Directory
... An index of Chinese food in your local area ... Sunnyvale CA ~~ Chinese ...
http://www.domain.tld/adir Rate This: [👍] [none] [👎]

Food
... ~~~~ El Camino Real, Sunnyvale (and other locations)... This is probably the worst Chinese food I've ever had ...
http://somedomain.tld/dir2/this.htm Rate This: [👍] [none] [👎]

FIG. 10

Search My Library — 1500

1504 — All Pages    Selected Folders    Selected Pages } 1502

☐ folder 1
☐ folder 2    1508
☐ folder 3

Search For:

in Page:         [              ] — 1514
in Title:        [              ] — 1516
in Keywords:     [              ] — 1518
in Description:  [              ] — 1520
in Referral:     [              ] — 1521

Ratings:

⊙ Any
○  Only  ← 1522
○ 👎 Only

[ Submit ] — 1526      [ Reset ] — 1528

Search for Related Docs — 1536
Search for Similar Docs — 1538

SEARCH SYSTEMS AND METHODS WITH INTEGRATION OF AGGREGATE USER ANNOTATIONS

CLAIM OF PRIORITY

This application is a continuation of and claims benefit to U.S. Ser. No. 11/082,212, filed Mar. 15, 2005, now U.S. Pat. No. 8,005,835, entitled "Search Systems and Methods with Integration of Aggregate User Annotations", which claims priority to U.S. Provisional Application Nos. 60/553,607, filed Mar. 15, 2004, and 60/614,232, filed Sep. 28, 2004, and are hereby incorporated by reference in their entirety.

The following regular U.S. patent applications are being filed concurrently, and the entire disclosures of the other two are incorporated by reference into this application for all purposes:

Application Ser. No. 11/081,860, entitled "Search Systems and Methods with Integration of User Annotations," now U.S. Pat. No. 8,005,850; and Application Ser. No. 11/081,871, entitled "Systems and Methods for Collecting User Annotations," now U.S. Pat. No. 7,599,950.

BACKGROUND OF THE INVENTION

The present invention relates in general to searching and navigating a corpus of documents or other content items, and in particular to search and navigation systems and methods with integration of user-supplied metadata (referred to herein as "annotations") related to individual items in the corpus.

The World Wide Web (web) provides a large collection of interlinked information sources (in various formats including documents, images, and media content) relating to virtually every subject imaginable. As the Web has grown, the ability of users to search this collection and identify content relevant to a particular subject has become increasingly important, and a number of search service providers now exist to meet this need. In general, a search service provider publishes a web page via which a user can submit a query indicating what the user is interested in. In response to the query, the search service provider generates and transmits to the user a list of links to Web pages or sites considered relevant to that query, typically in the form of a "search results" page.

Query response generally involves the following steps. First, a pre-created index or database of Web pages or sites is searched using one or more search terms extracted from the query to generate a list of hits (usually target pages or sites, or references to target pages or sites, that contain the search terms or are otherwise identified as being relevant to the query). Next, the hits are ranked according to predefined criteria, and the best results (according to these criteria) are given the most prominent placement, e.g., at the top of the list. The ranked list of hits is transmitted to the user, usually in the form of a "results" page (or a set of interconnected pages) containing a list of links to the hit pages or sites. Other features, such as sponsored links or advertisements, may also be included on the results page.

Ranking of hits is often an important factor in whether a user's search ends in success or frustration. Frequently, a query will return such a large number of hits that it is impossible for a user to explore all of the hits in a reasonable time. If the first few links a user follows fail to lead to relevant content, the user will often give up on the search and possibly on the search service provider, even though relevant content might have been available farther down the list.

To maximize the likelihood that relevant content will be prominently placed, search service providers have developed increasingly sophisticated page ranking criteria and algorithms. In the early days of Web search, rankings were usually based on number of occurrences and/or proximity of search terms on a given page. This proved inadequate, and algorithms in use today typically incorporate other information, such as the number of other sites on the Web that link to a given target page (which reflects how useful other content providers think the target page is), in addition to the presence of search terms on the page. One algorithm allows querying users to provide feedback by rating the hits that are returned. The user's ratings are stored in association with the query, and previous positive ratings are used as a factor in ranking hits the next time the same query is entered by any user.

Existing algorithms, however, fail to take into account differences between individual users. For example, two users who enter the same query could actually be interested in different things; a page or site that is relevant to one user might not be relevant to another. In addition, users may have personal preferences, e.g., regarding how content is organized and displayed, which content providers they trust, and so on, that will affect how they evaluate or rate a given site. Thus, a site that satisfies one user (or many users) might not satisfy the next user who enters the same query, and that user might still give up in frustration.

Another tool for helping individual users find content of interest to them is "bookmarking." Traditionally, bookmarking has been implemented in Web browser programs, and while viewing any page, the user can elect to save a bookmark for that page. The bookmark usually includes the URL (uniform resource locator) for the page, a title, and possibly other information such as when the user visited the page or when the user created the bookmark. The Web browser program maintains a list of bookmarks, and the user can navigate to a bookmarked page by finding the page in his list of bookmarks. To simplify the task of navigating a list of bookmarks, most bookmarking tools allow users to organize their bookmarks into folders. More recently, some Internet-based information services have implemented bookmarking tools that allow a registered user to create and access a personal list of bookmarks from any computer connected to the Internet.

While bookmarking can be helpful, this tool also has its limitations. For instance, organizing bookmarks into folders typically requires substantial user effort, and even with folders, it can be difficult for a user to remember which bookmarked page had a particular item of information that the user might be looking for at a given time. Also, existing bookmarking tools generally do not help the user identify whether he has already bookmarked a given page, nor do they provide any facilities for searching bookmarked information.

Thus, it would be desirable to provide improved tools for helping individual users collect and search content that is of interest to them.

BRIEF SUMMARY OF THE INVENTION

Embodiments of the present invention provide systems and methods allowing users to annotate content items found in a corpus of documents or other content items (e.g., the World Wide Web). As used herein, the term "annotation"

refers generally to any descriptive and/or evaluative metadata related to a document (e.g., a Web page or site) that is collected from a user and thereafter stored in association with that user. In embodiments of the present invention, annotations may include various fields of metadata, such as a rating (which may be favorable or unfavorable) of the document, a list of keywords identifying a topic (or topics) of the document, a free-text description of the document, and/or other fields. An annotation is advantageously collected from a user of the corpus and stored in association with an identifier of the user who created the annotation and an identifier of the document (or other content item) to which it relates.

In one embodiment, a user viewing a search results page is able to annotate the search hits and save the annotations. In another embodiment, a user can create and save an annotation for any page or site she visits. In still other embodiments, stored annotations can be used in various ways to enhance and personalize search and browsing operations. Examples of such enhancement and personalization include: highlighting hits in a listing of search results that correspond to annotated pages and/or allowing the user to view annotation data from the search result page; extracting user rating information from the annotations and using such information to affect the manner in which search results are presented; allowing the user to search his or her annotated pages (or annotation metadata) in addition to or instead of page content; or allowing the user to view and/or edit his or her annotation every time he or she visits an annotated page or site.

According to one aspect of the present invention, a method for responding to a user query includes accessing a store of annotations created by a number of annotating users. Each annotation is associated with one of the annotating users and with one of a number of documents belonging to a corpus, and each annotation includes user specific metadata related to the associated document. One or more items of user specific metadata related to the same one of the documents are aggregated across the plurality of annotating users, thereby generating one or more aggregate attributes for the document. A query submitted by a querying user is received, and the corpus is searched to identify one or more hits, where each hit is a document from the corpus that is determined to be relevant to the query. A search report including a listing of the hits is generated, with the listing being based at least in part on at least one of the aggregate attributes of the hits. The search report is transmitted to the querying user. The corpus may be, for example, the World Wide Web, and the user might be a human or a computer (or a human using a computer).

Various items of metadata can be aggregated. For example, the user specific metadata might include a rating for the associated document, and aggregating can include computing an average rating for the document, with the average rating being one of the aggregate attributes. In some embodiments, the average rating for each of the hits can be included in the search report. In other embodiments, the listing of the hits is arranged in an order based at least in part on the average rating for each of the hits.

As another example, the user specific metadata might include a user supplied keyword describing the associated document, and aggregating can include identifying a keyword set of most frequently supplied keywords, with the keyword set being one of the aggregate attributes. In some embodiments, searching the corpus includes extracting a search term from the query and identifying as a hit any document in the corpus for which the keyword set includes the search term. In other embodiments, the search report includes the keyword set for each hit. In still other embodiments, a label selected from a predefined vocabulary by the annotating user might be used in addition to or instead of a user-supplied keyword; the predefined vocabulary might include, e.g., various category labels.

In some embodiments, the method also includes identifying, as an annotated hit, each of the hits for which the store of annotations contains an annotation created by the querying user and associated with that hit. For each of the hits for which the store of annotations contains an annotation created by the querying user, in the search report advantageously includes an indication of whether each hit is an annotated hit. The search report may also include a control operable by the user to view the user's annotation for the hit and/or metadata extracted from the user's annotation of the hit.

According to another aspect of the present invention, a computer system for responding to user queries includes an index data store, a personalization data store, an aggregation module communicably coupled to the personalization data store and the index data store, and a search module communicably coupled to the personalization database and the index data store. The index data store is configured to store a searchable representation of a corpus comprising a number of documents. The personalization data store is configured to store annotations created by annotating users, each annotation being associated with one of the documents in the corpus, each annotation including user specific metadata related to that document. The aggregation module is configured to aggregate, across the annotating users, one or more items of user specific metadata related to one of the documents, thereby generating one or more aggregate attributes for the document, and to store each of the aggregate attributes for the document in the index data store. The search module includes input control logic, search control logic, and reporting control logic. The input control logic is configured to receive a query submitted by a querying user. The search control logic is configured to search the index data store and to identify one or more hits, wherein each hit is a document in the corpus that is determined to be relevant to the query. The reporting control logic is configured to generate a search report including a listing of the hits, the listing based at least in part on the aggregate attributes of the hits, and the reporting control logic is further configured to transmit the search report to the querying user.

The following detailed description together with the accompanying drawings will provide a better understanding of the nature and advantages of the present invention.

BRIEF DESCRIPTION OF THE DRAWINGS

FIG. 10 is an example of a search result page according to another embodiment of the present invention.

DETAILED DESCRIPTION OF THE INVENTION

Embodiments of the present invention provide systems and methods allowing users to annotate content items found in a corpus of documents or other content items (e.g., the World Wide Web). As used herein, the term "annotation" refers generally to any descriptive and/or evaluative metadata related to a document (e.g., a Web page or site) that is collected from a user and thereafter stored in association with that user. In embodiments of the present invention, annotations may include various fields of metadata, such as a rating (which may be favorable or unfavorable) of the document, a list of keywords identifying a topic (or topics) of the document, a free-text description of the document, and/or other fields. An annotation is advantageously collected from a user of the corpus and stored in association with an identifier of the user who created the annotation and an identifier of the document (or other content item) to which it relates.

In one embodiment, a user viewing a search results page is able to annotate the search hits and save the annotations. In another embodiment, a user can create and save an annotation for any page or site she visits. In still other embodiments, stored annotations can be used in various ways to enhance and personalize search and browsing operations. For example, when the user searches the corpus, any hits corresponding to pages that the user has annotated (referred to herein as "annotated hits") can be highlighted, with a link being provided to allow the user to view her annotation. Where the annotation includes judgment data such as a numerical rating, the annotated hit can be highlighted to indicate whether the user's judgment was favorable or unfavorable. The ratings can also be used for ranking search results in response to the user's queries, with favorable judgments tending to increase the ranking of a given page or site and unfavorable judgments tending to decrease the ranking. Where the annotation includes user-supplied free text and/or descriptive keywords or labels, the user may have the option to search her annotations in addition to or instead of page content. In other embodiments, any time the user visits a page she has annotated, a control is provided allowing the user to view and/or edit her annotation.

For purposes of illustration, the present description and drawings may make use of specific queries, search result pages, URLs, and/or Web pages. Such use is not meant to imply any opinion, endorsement, or disparagement of any actual Web page or site. Further, it is to be understood that the invention is not limited to particular examples illustrated herein.

I. Overview

A. Network Implementation Overview

Figure 1:
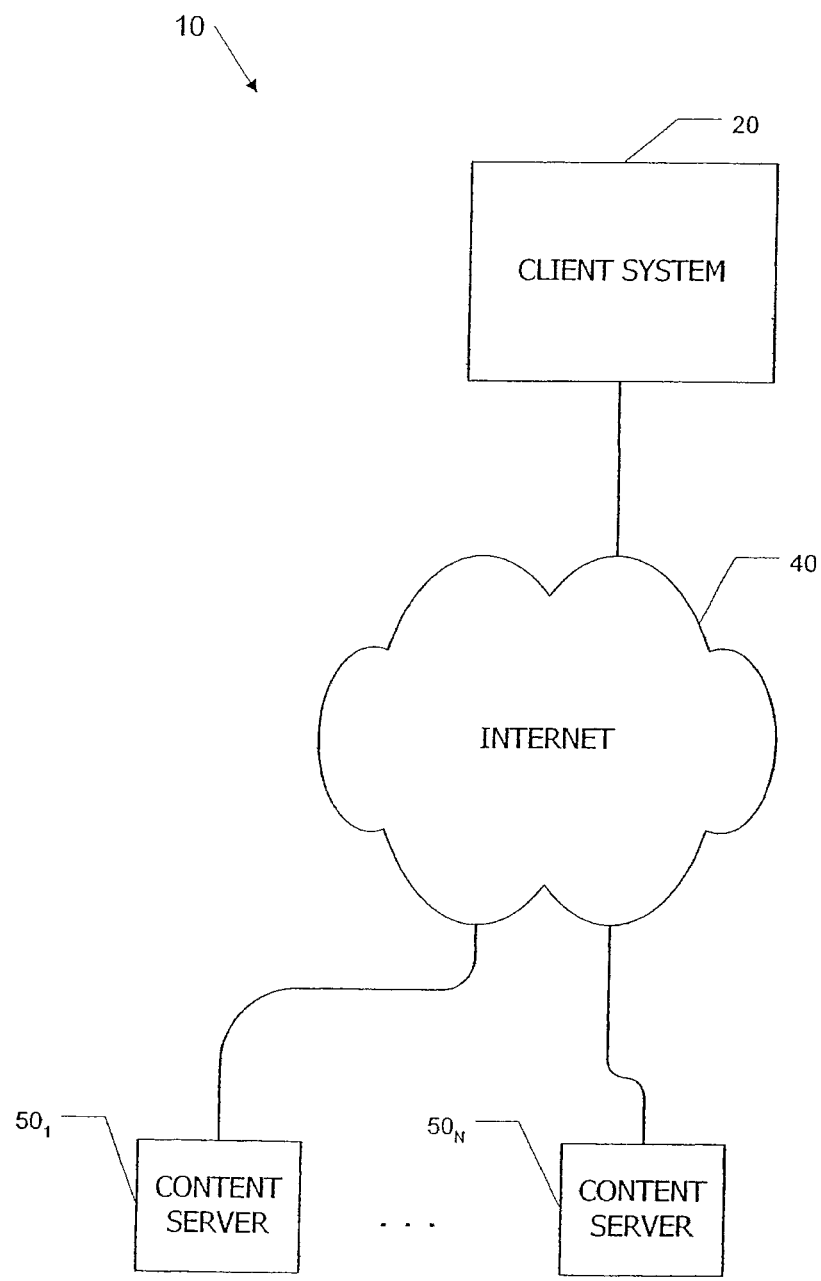
FIG. 1 is a block diagram of an information retrieval and communication network according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internet work of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search and Annotation System Overview

Figure 2:
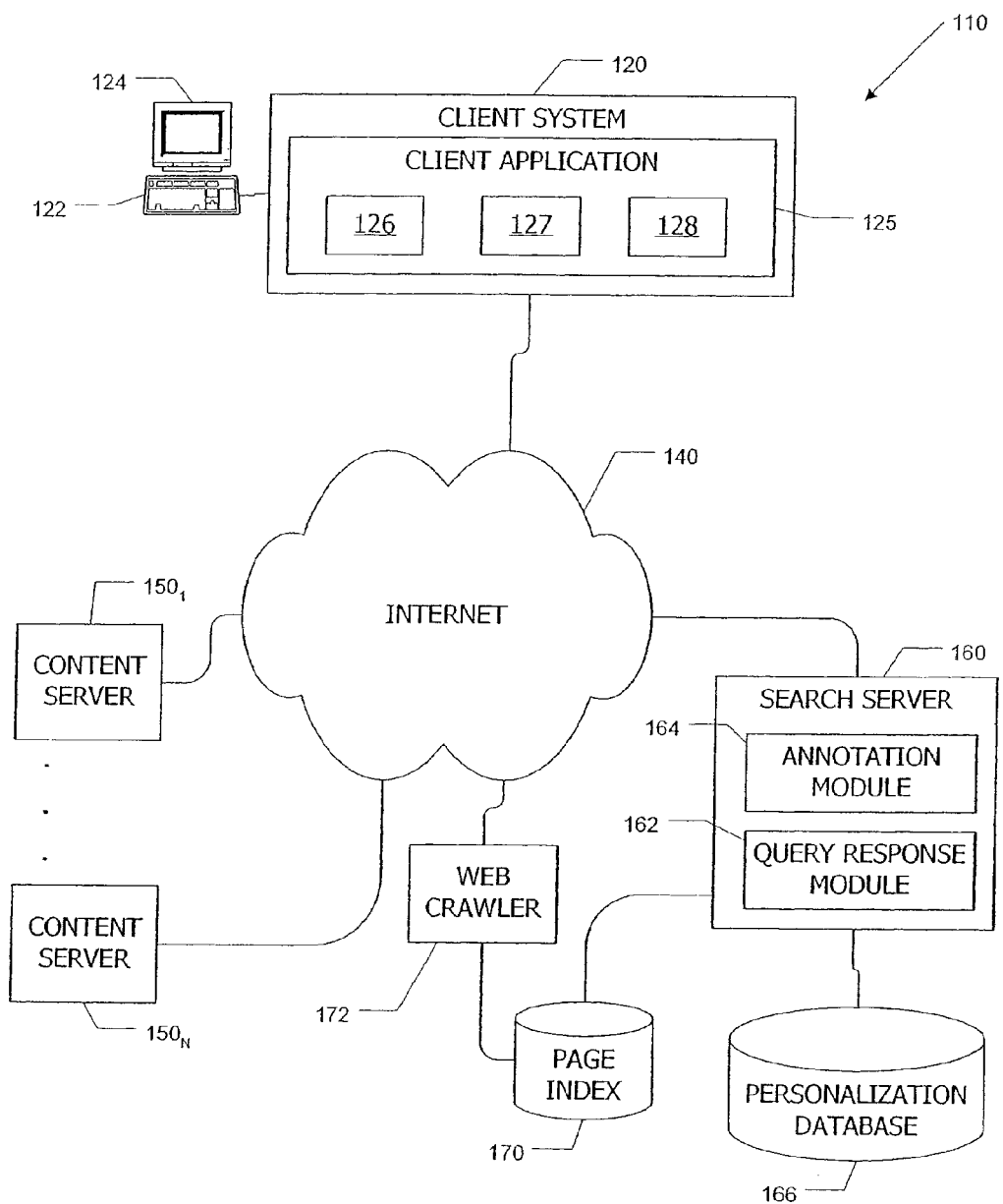
FIG. 2 is a block diagram of an information retrieval and communication network according to another embodiment of the present invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As described above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received there from. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as described above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of applications executing on client system 120 with which application interface module 128 is preferably configured to interface according to aspects of the present invention include various e-mail applications, instant messaging (IM) applications, browser applications, document management applications and others. Further, user interface module 127 may include a browser, such as a default browser configured on client system 120 or a different browser.

According to one embodiment, search server system 160 is configured to provide search result data and media content to client system 120, and content server system 150 is configured to provide data and media content such as web pages to client system 120, for example, in response to links selected in search result pages provided by search server system 160. In some variations, search server system 160 returns content as well as, or instead of, links and/or other references to content. Search server system includes a query response module 162 configured to receive a query from a user and generate search result data therefore, as well as a user annotation module 164 configured to detect and respond to user interaction with the search result data as described below.

Query response module 162 in one embodiment references various page indexes 170 that are populated with, e.g., pages, links to pages, data representing the content of indexed pages, etc. Page indexes may be generated by various collection technologies including an automatic web crawler 172, and/or various spiders, etc., as well as manual or semi-automatic classification algorithms and interfaces for classifying and ranking web pages within a hierarchical structure. These technologies may be implemented in search server system 160 or in a separate system (e.g., web crawler 172) that generates a page index 170 and makes it available to search server system 160. Various page index implementations and formats are known in the art and may be used for page index 170.

Query response module 162 in one embodiment also references a personalization database 166. Personalization database 166, which may be implemented using conventional database technologies, includes user-specific information, in particular records of user-supplied annotations for various Web pages or sites. As described below, the annotations can include any type of user-supplied metadata including descriptive and/or evaluative information; the metadata might include free text, keywords or labels, numerical ratings reflecting a user judgment (e.g., favorable or unfavorable) as to the merits of particular Web pages or sites, and so on. Examples of content and formats for annotations and techniques for collecting annotations to be stored in personalization database 166 are described below.

Query response module 162 is configured to provide data responsive to various search requests (queries) received from a client system 120, in particular from search module 126. As used herein, the term "query" encompasses any request from a user (e.g., via client 120) to search server 160 that can be satisfied by searching the Web (or other corpus) indexed by page index 170. In one embodiment, a user is presented with a search interface via search module 126. The interface may include a text box into which a user may enter a query (e.g., by typing), check boxes and/or radio buttons for selecting from predefined queries, a directory or other structure enabling the user to limit search to a predefined subset of the full search corpus (e.g., to certain web sites or a categorical subsection within page index 170), etc. Any search interface may be used.

Query response module 162 is advantageously configured with search related algorithms for processing and ranking web pages relative to a given query (e.g., based on a combination of logical relevance, as measured by patterns of occurrence of the search terms in the query; context identifiers associated with query terms and/or particular pages or sites; page sponsorship; connectivity data collected from multiple pages; etc.). For example, query response module 162 may parse a received query to extract one or more search terms, then access page index 170 using the search terms, thereby generating a list of "hits", i.e., pages or sites (or references to pages or sites) that are determined to have at least some relevance to the query. Query response module

162 may then rank the hits using one or more ranking algorithms. Particular algorithms for identifying and ranking hits are not critical to the present invention, and conventional algorithms may be used.

In embodiments of the present invention, query response module 162 is also configured to retrieve from personalization database 166 any annotation data associated with the user who entered the current query and to incorporate such annotation data into the search results. For example, where at least some of the annotations include ratings (or other data reflecting a user's evaluation of the page or site), query response module 162 might generate a separate list of "favored" results based on favorable user ratings of particular pages or sites previously annotated by that user; or query response module 162 might incorporate the user's ratings of particular pages of sites in the ranking of search results; or query response module 162 might use unfavorable user ratings of particular pages or sites to determine whether to drop a hit from the list of results. Where the annotations include free text, keywords or labels, the appearance of a search term in any of these elements may be considered during identification and/or ranking of search hits.

User annotations may be provided to personalization database 166 in various ways. In some embodiments, search result data is presented as a results page including a list of hits. For each hit, the results page may include, e.g., a page or site title, a link to the page or site, one or more excerpts from the content of that page or site (e.g., showing the context in which search terms occur), and other options, such as a link to a cached copy of the content. The result data may also include buttons or other interface elements allowing the user to annotate any of the hit pages or sites. For example, the user can be invited to rate the page or site on a predefined scale (e.g., thumbs-up or thumbs-down, zero to four stars, numerical ratings from 1 to 10, etc.), to enter a free-text description of the page or site, to select labels describing the page or site from a predefined list, or to enter one or more keywords to describe the page or site.

When the user elects to annotate a hit page or site, user annotation module 164 receives the new annotation data from the user (e.g., via client system 120) and updates personalization database 166. In one embodiment, user annotation module 164 also initiates an automatic refresh of the results page in response to the new annotation data. During this refresh operation, the hits listed on the results page may be reranked using the new data, and an updated results page reflecting the new rankings is transmitted to the user. In cases where the new annotation includes a favorable rating, the new page may also list the newly annotated site among the "favored" results. Accordingly, the user's new annotations can have an immediate effect on the displayed results of the current search, as well as being stored for use in processing future queries from that user.

To enable search personalization features such as user annotations, search server 160 advantageously provides a user login feature, where "login" refers generally to any procedure for identifying and/or authenticating a user of a computer system. Numerous examples are known in the art and may be used in connection with embodiments of the present invention. For instance, in one embodiment, each user has a unique user identifier (ID) and a password, and search server 160 prompts a user to log in by delivering to client 120 a login page via which the user can enter this information. In other embodiments, biometric, voice, or other identification and authentication techniques may also be used in addition to or instead of a user ID and password. Once the user has identified herself, e.g., by logging in, the user can enter and/or update her annotations by interacting with user annotation module 164 as described below. Further, each query entered by a logged-in user can be associated with the unique user ID for that user; based on the user ID, query response module 162 can access personalization database 166 to incorporate the user's stored annotations into responses to that user's queries. User login is advantageously persistent, in the sense that once the user has logged in (e.g., via client application 125), the user's identity can be communicated to search server 160 at any appropriate time while the user operates client application 125. Thus, personalization features described herein can be made continuously accessible to a user.

In addition to using the user's own annotations in responding to a query, query response module 162 may also use aggregate information about other users' annotations. For example, in one embodiment, an aggregate rating (e.g., an average rating) for a page or site is computed from the ratings of every user who has provided an annotation with a rating for that page or site. In another embodiment, aggregate keywords or labels describing a page or site may be determined, e.g., by identifying those keywords or labels that have most frequently been applied to that page or site by the users who have annotated it. Such aggregate annotations for a given page may be stored, e.g., in page index 170, and used by query response module 162 to rank hits in response to a query, regardless of whether the user is known to search server 160.

In one embodiment, user annotation module 164 forwards new annotation data as it is received to an aggregator module (not shown in FIG. 2) that updates the aggregate annotation data stored in page index 170. Aggregate annotation data may be updated at regular intervals, e.g., daily or hourly, or approximately in real time. Collection ad use of aggregate annotation data is described further below.

It will be appreciated that the search system described herein is illustrative and that variations and modifications are possible. The content server and search server system may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably. In addition, the query response module and user annotation module described herein may be implemented on the same server or on different servers.

The search server system may be configured with one or more page indexes and algorithms for accessing the page index(as) and providing search results to users in response to search queries received from client systems. The search server system might generate the page indexes itself, receive page indexes from another source (e.g., a separate server system), or receive page indexes from another source and perform further processing thereof (e.g., addition or updating of various page information). In addition, while the search server system is described as including a particular combination of component modules, it is to be understood that a division into modules is purely for convenience of description; more, fewer, or different modules might be defined.

In addition, in some embodiments, some modules and/or metadata described herein as being maintained by search server 160 might be wholly or partially resident on a client system. For example, some or all of a user's annotations could be stored locally on client system 120 and managed by a component module of client application 125. Other data, including portions or all of page index 170, could be periodically downloaded from search server 160 and stored by client system 120 for subsequent use. Further, client application 125 may create and manage an index of content stored locally on client 120 and may also provide a capability for searching locally stored content, incorporate search results including locally stored content into Web search results, and so on. Thus, search operations may include any combination of operations by a search server system and/or a client system.

In accordance with one embodiment of the present invention, users may interact with search server 160 to annotate search result and other pages via user annotation module 164. The annotations may include positive or negative ratings (or other information reflecting a user's favorable or unfavorable opinion of the subject page or site), keywords, free-text descriptions, and/or other elements that provide descriptive and/or evaluative information about a page or site. Each user's annotations are stored in personalization database 166 and are advantageously used in responding to current and future queries submitted by that user. In some embodiments, user annotations can also be used to provide various customized search services as described below.

In embodiments of the present invention, annotations can be collected from users in a variety of ways, including annotations entered from a search results page, annotations entered using a toolbar interface, and the like. Examples of collecting annotation data are described below.

II. User Annotation Data Formats

User annotations may be collected in a variety of formats and may provide various information about a page or site. While an example format is described herein, it is to be understood that user annotations are not limited to the particular content or format of this example and that an annotation may include any combination of user-provided and/or automatically generated metadata related to a page or site.

As used herein, a "page" refers to a unit of content that is identifiable by a unique locator (e.g., a URL) and displayable by a suitably configured browser program. A "site" refers to a group of one or more pages related to common subject matter and located on the same server. In some embodiments of the invention, the user who creates an annotation can indicate whether that annotation should apply to a single page or to a group of related pages In the latter case, the user can advantageously define the scope of the site, as described below. In some embodiments, there is no difference between a page annotation and a site annotation other than the number of pages to which the annotation applies.

A. Content of Annotations

Figure 3:
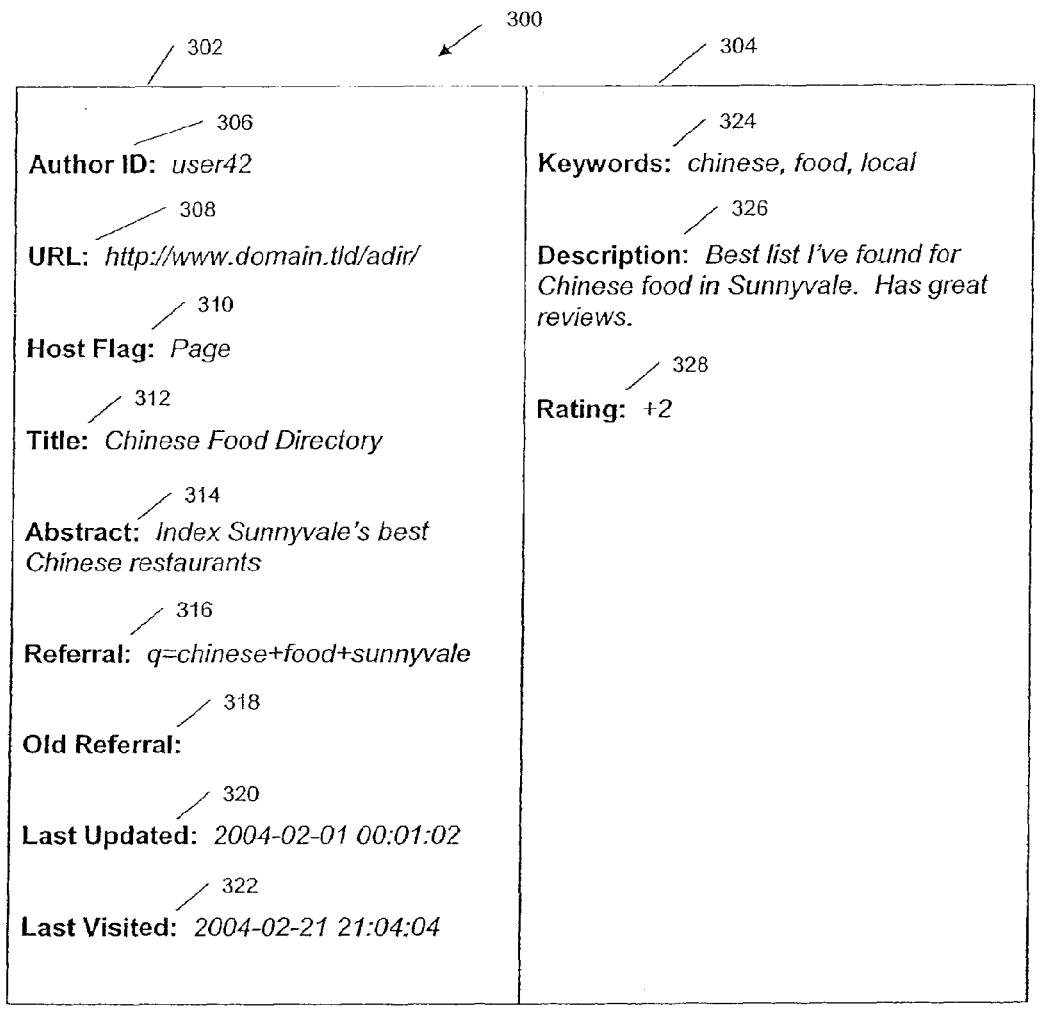
FIG. 3 is a schematic representation of an annotation record according to an embodiment of the present invention.

In one embodiment, each annotation is a structured entry in a personalization database 166. FIG. 3 illustrates the content fields of an annotation 300. Fields in left column 302 can be automatically generated and updated by user annotation module 164; fields in right column 304 are preferably user-supplied.

The automatically generated fields include an "Author ID" field 306 that stores the user ID of the user who created the annotation and a "URL" field 308 that identifies the page or site to which the annotation pertains. "Host flag" field 310 indicates whether the annotation applies to a page or to a site. If the host flag is set to "page," the annotation applies only to the page whose URL exactly matches the string in field 308, whereas if the host flag is set to "site," the annotation applies to any page whose URL begins with the string shown in field 308. Thus, an annotation with host flag set to "site" could apply to any number of pages. Host flag field 310 may be automatically set to a default value (e.g., "page"), and the user can be given the option to change the value.

"Title" field 312 stores a title for the subject page (or site). This field is advantageously filled by default with a page title extracted from the subject page's source code; in some embodiments, the user is allowed to change the title. "Abstract" field 314 stores a text abstract of the subject page or site; this abstract can be automatically generated as described below, or the user can be invited to apply an abstract.

The remaining fields in column 302 provide historical information about the annotation. For instance, "referral" field 316 provides contextual information about how the user arrived at the subject page or site. In the case of an annotation entered from a search results page, referral field 316 advantageously includes the query in response to which the results page was produced, as shown in FIG. 3. Where the user supplies an annotation for a currently displayed page via a toolbar interface, the referral field 316 might include historical information about what the user was viewing prior to navigating to and annotating the subject page. For instance, if the user navigated to the subject page by following a link from another page, referral field 316 might contain the URL of that other page. If the user navigated to the subject page by clicking on a link in another program (e.g., an e-mail client or word processor), referral field 316 might identify the program. If the user entered the URL for the subject page manually (e.g., typing it into an address bar of the browser window), referral field 316 might indicate manual entry. It should be noted that the referral field is not limited to a single entry; for instance, in some embodiments, the referral field might store a longer navigation trail (e.g., the entire browser session leading up to navigating to and annotating the subject page, including any search queries entered during that session regardless of whether the subject page was returned as a hit or visited by the user).

Where a user has annotated a page and later revised that annotation, referral field 316 is advantageously updated to identify the referral source that led to the revised annotation. "Old referral" field 318 can be used store contextual information related to the previous annotation; this information would be similar to information stored in referral field 316. Any number of old referrals may be maintained.

"Last updated" field 320 provides a timestamp indicating when the user last updated the annotation. "Last visited" field 322 provides a timestamp indicating when the user last visited the annotated page. While FIG. 3 shows these timestamps in a YYYY-MM-DD HH:MM:SS format, it is to be understood that other formats and any desired degree of precision might be substituted. This information can be used, e.g., to identify older annotations as possibly being less reliable (especially where the annotated page has been updated more recently than the user's last visit to that page).

The fields in column 304 are supplied by the user and are advantageously left empty until and unless the user supplies data. In preferred embodiments, the user is not required to enter data for all of these fields, and any empty fields can be ignored when the annotation data is used in search processing as described below.

"Keywords" field 324 stores one or more user-supplied keywords or user-selected labels describing the annotated page. As used herein, "keyword" (also sometimes referred to in the art as a "tag") refers to a word or short phrase provided by the user, who is free to choose any word or phrase, while "label" refers to a word or short phrase selected by the user from a system-defined vocabulary, such as a hierarchical list of category identifiers. In some embodiments where keywords are used, various prompts or other techniques may be incorporated into the system to encourage the user to adopt "normalized" keywords (e.g., standard spellings, standard choices among synonyms such as "bicycling" vs. "cycling" vs. "biking," or the like). Keyword normalization is particularly helpful where aggregate keywords for a page are derived from annotations by different users as described below. In some embodiments, the user may be limited to some maximum number (e.g., 10, 20, or another number) of keywords or labels.

"Description" field 326 stores a user-supplied free text description of the page or site. In populating this field, the user is not limited to words or short phrases or to any particular length. In some embodiments, description field 326 allows the user to compose and store a fairly lengthy discussion of the content (e.g., up to 500 or 1000 words), and the user may also be allowed to include links to other content as part of the description. Links could be included, e.g., to identify other sites that provide more detail about topics mentioned by the annotated page.

"Rating" field 328 stores a numerical value or other indicator reflecting the user's opinion or judgment of the page. Ratings may be provided using various scales, and the scale preferably allows at least "favorable," "unfavorable" and "neutral" ratings. For example, in one embodiment the user is prompted during creation of an annotation to give a favorable (e.g., thumbs-up) or unfavorable (e.g., thumbs-down) rating to the annotated page. The favorable and unfavorable ratings are each assigned a numerical value (e.g., +2 and -2 respectively); unrated pages are given a default (neutral) rating of zero. Other rating systems, e.g., zero to four stars, a 1 to 10 rating, or the like, may also be used. The rating indicator stored in field 328 need not match the rating scale used by the user (e.g., if the user rates a site on a scale of 1 to 10, this could be translated to a rating indicator in the range from -4 to 5). Any sites the user annotates but does not rate are advantageously treated as having a neutral rating.

It is to be understood that annotation entry 300 is illustrative and that other annotation formats with different fields may also be used. For instance, in some embodiments, the annotation may include a representation of part or all of the content of the subject page in a compressed or uncompressed form. In other embodiments, the user can connect a description to a specific portion of the content of the subject page, and the portion to which the description is connected may be stored in the annotation. In another embodiment, search server 160 may also categorize pages or sites according to some taxonomy, and such category data may be saved as part of the annotation.

Other metadata related to the annotated page (or site) may also be collected in the annotation record and automatically updated as the user continues to browse. For example, a counter might be provided to count the number of times the user visits an annotated page or site. The counter and/or the last-visited timestamp can be automatically updated each time the user visits the page or site. In some embodiments, only visits that occur while the user is logged in to search server 160 result in automatic updating.

Annotations in some embodiments may also include metadata that is not user-specific. For example, metadata might also include a real-world location (e.g., latitude and longitude coordinates, street address or the like) or phone number related to the subject page or site, a UPC (universal product code) or ISBN (international standard book number) or ISSN (international standard serial number) related to the subject page or site, and/or other similar information. In addition, metadata relating to various attributes or behaviors of the subject page or site, such as whether it includes adult content, what human language(s) it uses (e.g., English, Japanese, Spanish, etc.), or whether it includes pop-up windows or the like, could also be incorporated into an annotation independently of user input.

Annotation entries may be formatted in any format suitable for storing in personalization database 166 (e.g., relational database schema, XML records or the like) and can be accessed by reference to various fields. In one embodiment, the annotation record is accessible by at least author ID, URL, title, and keywords.

B. Organization of Annotations

In some embodiments, users can organize their annotations using folders. For example, each user may have a "Main" folder, into which that user's new annotations are placed by default. The user may create additional folders as desired. In some embodiments, the user may also define subfolders within folders. User interfaces for creating and managing folders may be of generally conventional design.

Figure 4:
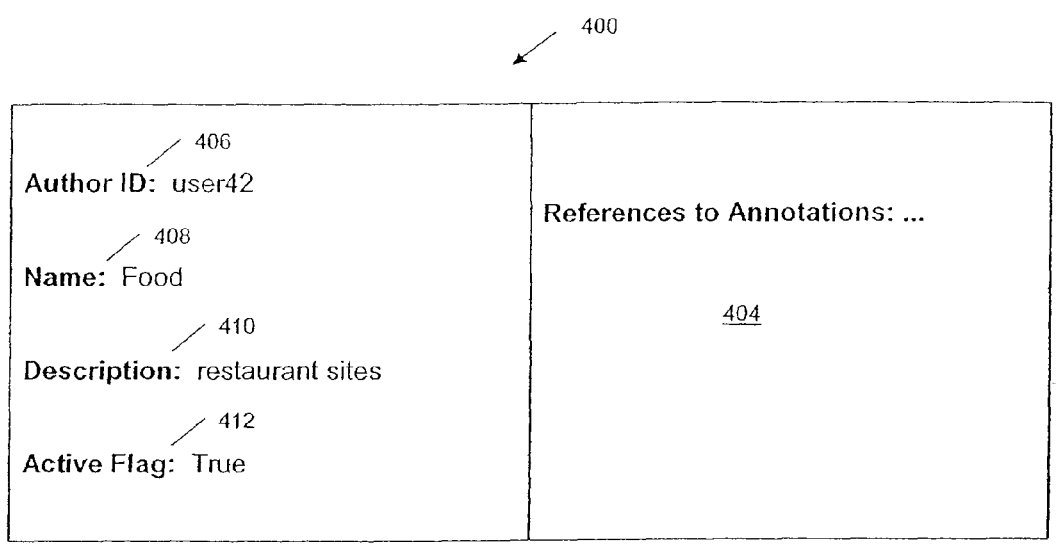
FIG. 4 is a schematic representation of a folder record for organizing annotations according to an embodiment of the present invention.

In one embodiment, each folder is defined using a folder entry in personalization database 166. FIG. 4 illustrates a folder entry 400 according to an embodiment of the present invention. Folder entry 400 includes a references field 404 that provides references (e.g., persistent pointers) to the annotations and/or subfolders belonging to folder 400; a linked list or other suitable data structure may be used to implement references 404.

Folder entry 400 also advantageously includes other fields usable for folder management. In one embodiment, those fields include an "Author ID" field 406 that stores the user ID of the user to whom the folder belongs and a "Name" field 408 that stores a user-supplied folder name (e.g., with an upper limit of 80 characters). "Name" field 408 may default to "New Folder" or some other suitable string. "Description" field 410 stores a user-editable free text description of the folder's purpose or content; this field may default to an empty state. "Active" field 412 stores a flag (e.g., a Boolean value) indicating whether the annotations in that folder should be used in responding to queries.

It will be appreciated that folder formats may vary and that other fields may be included. With the exception of the "Main" folder, the user may freely create, rename, and delete folders. In some embodiments, multiple folders can store a reference to the same annotation; in other embodiments, each annotation is assigned to exactly one folder at a time, and users can move annotations from one folder to another or create a copy of an annotation in a different folder. In some embodiments, each annotation entry may also include a "folder ID" field that stores a reference back to the folder(s) to which the annotation is assigned.

While folders are optional, providing folders allows an additional degree of user control over the search experience. For example, a user can arrange her annotations in multiple folders, with the "active" flag set to true for one or more of the folders and to false for others. When the user enters a query, only annotations in the active folder(s) would affect the results. The user may also use folders to collect and organize annotated pages in a manner somewhat similar to "bookmarks" or other personal site lists supported by various Web browser programs or Internet portal services. In preferred embodiments, the folders and annotation data described herein are maintained for the user by search server 160 and can be made available to the user regardless of the location from which she accesses search server 160.

In another embodiment, folders are not used, and use of annotations is instead managed based on the user-supplied keywords or labels in the annotation records. For example, the active flag and/or publication flag may be defined per keyword rather than per folder.

C. Interface Page to Annotations

As users find and annotate various pages or sites, each user will build up a personal "library" of Web content that is useful to that user. In some embodiments, user annotation module 164 (FIG. 2) provides an interface that allows a user to manage her library of annotations and to interact with her annotation data in a variety of ways. For example, user annotation module 164 may be configured to generate and provide to each user a customized "My Library" page. A user who is logged in to search server 160 can request this page, e.g., by following a link from a search interface or search results page, by following a link from a personalized or generic portal page or site hosted by search server 160, or by activating a button on a browser toolbar or other persistent interface. In some embodiments, a user who is not logged in can request her "My Library" page, then be prompted to log in before the page is displayed.

Figure 5:
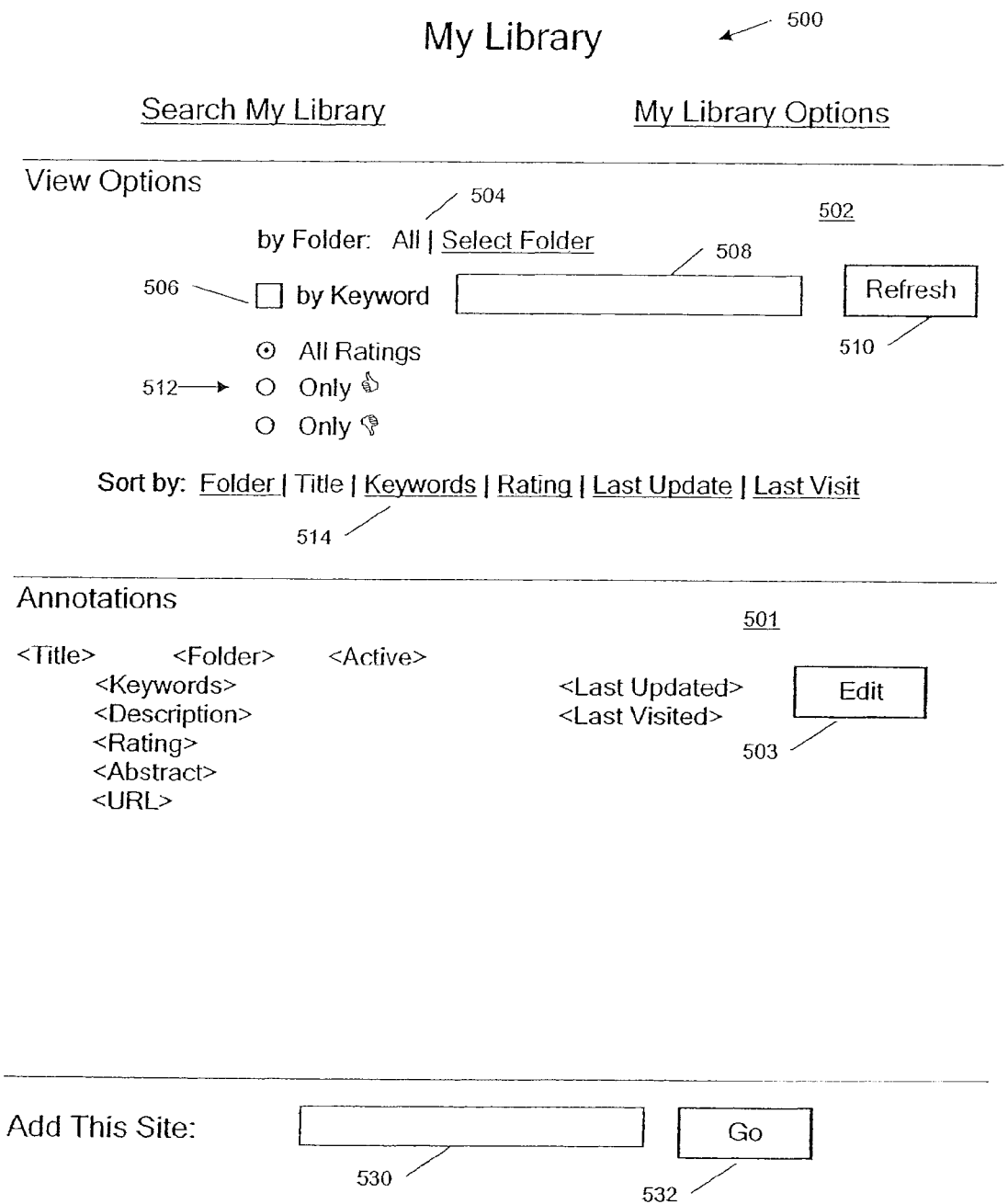
FIG. 5 is an example of a user interface page for viewing and organizing annotations according to an embodiment of the present invention.

FIG. 5 is an example of one implementation of a library interface page 500 for a user according to an embodiment of the present invention. Page 500 includes a section 501 that displays annotations from the user's library. Various fields from each annotation (e.g., the fields shown in FIG. 3) can be displayed, and a link to each annotated page or site is advantageously provided. An "Edit" button 503 allows the user to edit an annotation. The editing interface can be generally similar to the creation interface, which is described below, and may also allow the user to move or copy annotations from one folder to another.

Section 502 provides interface controls for selecting and arranging annotations to be displayed in section 501. For instance, button group 504 allows a user to select one or more folders to be viewed. The default selection is "all," and activating the "Select Folders" option in group 504 takes the user to a folder selection interface (not shown), which may be of generally conventional design and may allow the user to select one folder, a group of folders, or a folder and its subfolders. When the user finishes selecting folders to view and returns to page 500, the page is updated to reflect the current folder selection.

A checkbox 506 allows the user to request a display of only those annotations that include one or more user-specified keywords. After checking box 506 and entering one or more desired keywords in a text box 508, the user activates "Refresh" button 510 to refresh the listing. In response to activation of button 510, search server 160 searches the keyword field of the user's annotations for the keyword(s) from text box 508 and updates the listing in section 501 to include only the annotations having matching keywords.

Radio buttons 512 allow the user to specify whether all annotations, or only annotations with favorable (or unfavorable) ratings, should be displayed. Radio buttons 512 advantageously default to selecting all annotations, and the user can change this setting at will.

Button group 514 allows the user to specify how the list of annotations in section 501 should be arranged, e.g., by folder, by title, by rating, by keywords, or by the timestamp of the last update of the annotation or last visit to the annotated page or site.

It should be noted that the various controls in section 502 can be used together. For instance, the user can specify that only annotations in a particular folder that include a particular keyword should be displayed, or that only annotations with positive ratings in a particular folder (or group of folders) should be displayed, and so on.

In other embodiments, other arrangements of annotations can be viewed. For example, a list of some number (e.g., 5, 10, 20, 50) of most frequently visited annotated pages, most recently visited annotated pages, or most recently annotated pages might be viewable. In other embodiments, the user can also view contextual information about the annotation (e.g., the contents of Referral field 316 and/or Old Referral field 318 shown in FIG. 3).

In various embodiments, page 500 can support other user interactions with annotations. For example, using text box 530, the user can provide the URL of a new page or site to be annotated, then activate "Go" button 532 to create the annotation. In some embodiments, if the URL entered in text box 530 matches a URL of an existing annotation, the user is shown the existing annotation and invited to update it.

"Search My Web" button 540 initiates a search operation using the user's library (or a portion thereof) as the search corpus. This operation is described below.

It will be appreciated that the library interface page described herein is illustrative and that variations and modifications are possible. Any interface that allows the user to view, organize, and search her annotations may be used, and the interface may have more features, fewer features, or different features from the particular combination shown.

III. Collection of Annotation Data

Figure 6:
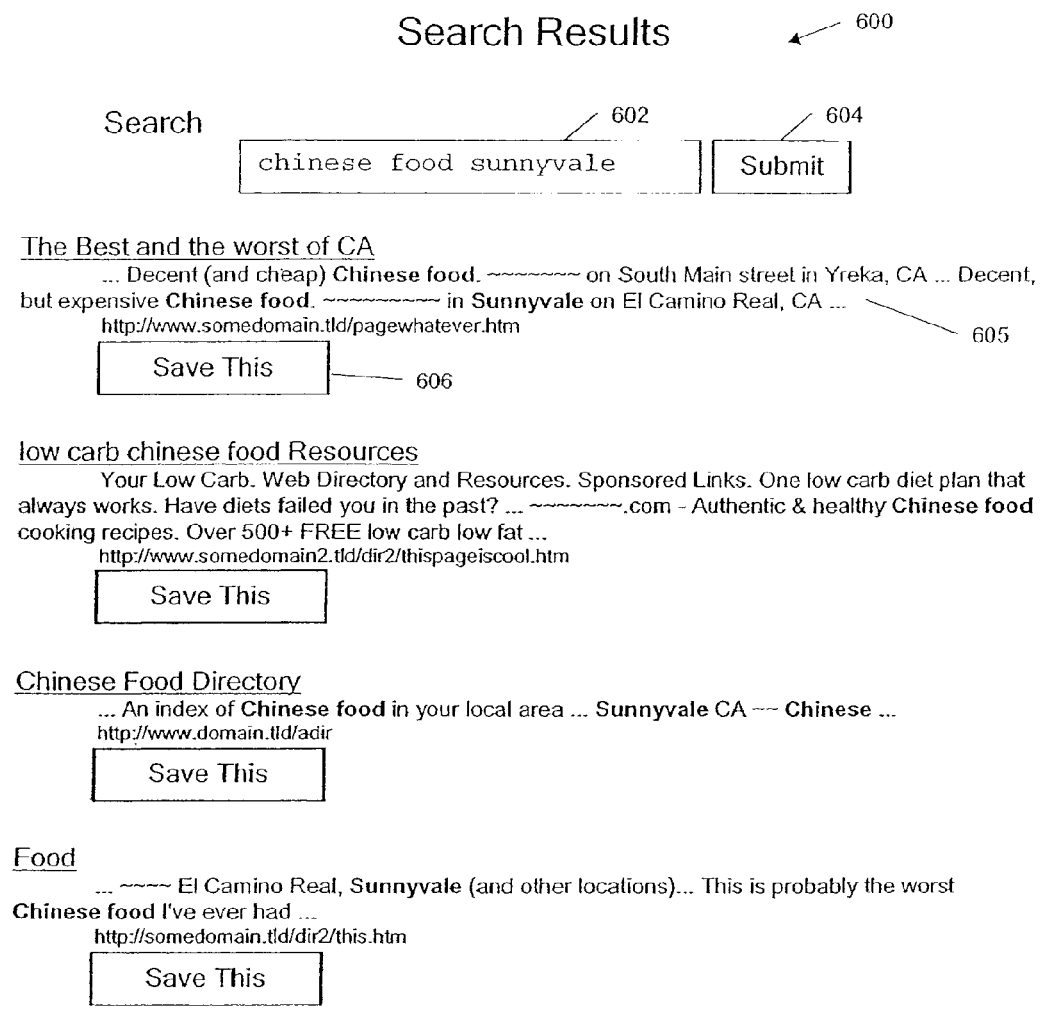
FIG. 6 is an example of a search result page according to an embodiment of the present invention.

In preferred embodiments, various interfaces are provided by which the user can indicate a desire to annotate a particular page or site and thereby initiate creation of an annotation. FIG. 6 is an example of a search results page 600 (also referred to herein as a search report) that provides an interface for annotating hit pages or sites. Search results page 600 is generated in response to a user query as shown in text box 602; "submit" button 604 is used to submit queries. Each result 605 includes various information, such as the title, an automatically generated abstract, a URL, and the like. Next to (or below) each result is a "Save This" button 606 that launches a page or dialog box via which the user can annotate that particular hit. An example of a suitable page is described below.

Figure 7:
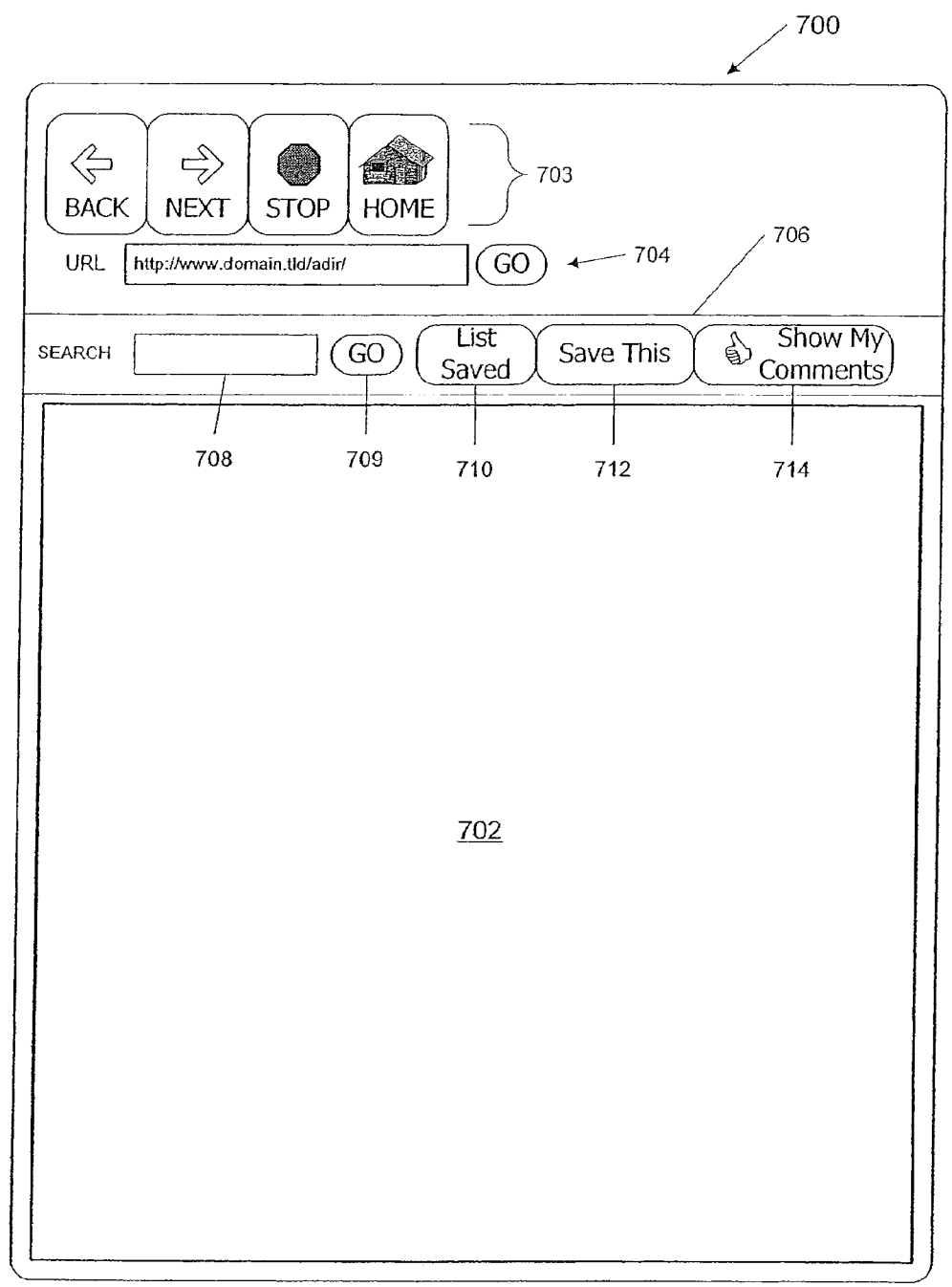
FIG. 7 is an example of a search toolbar for a Web browser according to an embodiment of the present invention.

FIG. 7 is an example of a toolbar-based interface for annotating any page the user happens to be viewing. A Web browser window 700 includes conventional elements such as a viewing area 702 for displaying Web content and default toolbars providing navigation buttons (back, forward, and the like) and a text box 704 that shows the URL of the currently displayed page and also allows the user to enter a URL for a page to be displayed in viewing area 402. Browser window 700 also includes a search toolbar 706 that may be provided as an add-in to a conventional browser program or as a standard feature of a browser program.

Search toolbar 706 advantageously includes a text box 708 and "Search" button 709 via which the user can submit queries to search server 160 (FIG. 2), a "List Saved" button 710 allowing the user to view her saved annotations and to navigate to annotated pages, and a "Save This" button 712 that opens a page or dialog box allowing the user to annotate the currently displayed page. In some embodiments, search toolbar 706 also includes a "Show My Comments" button 714 that appears in an active state whenever the user is viewing a page that she has previously annotated; the user can operate button 714 to view her previous annotation. Where the annotations include ratings, the appearance of button 714 may depend in part on the rating (e.g., the rating may be reflected by an icon included in the button). Search toolbar 706 may also include other components in addition to or instead of those shown. In addition, any other persistent interface (i.e., an interface accessible while the user is viewing any Web page) may be substituted; a search toolbar is not required.

In some embodiments, search toolbar 706 can be configured such that it is usable in a "generic" state by users who are not logged in to search server 160 and in a "personalized" state by users who are logged in. In the generic state, the toolbar provides access to basic search services (e.g., via text box 708 and "Search" button 709) and a button allowing the user to log in for access to personalized services. In the personalized state, personalization features can be supported through the toolbar. For instance, "Save This" button 712 might be provided only in the personalized state of toolbar 706; alternatively, button 712 might also be provided in the generic state, with the browser being redirected to a log-in page if button 712 is activated while the toolbar is in the generic state.

In some embodiments, the user may be offered multiple options for initiating creation of an annotation, including, e.g., the URL entry box 530 on "My Library" page 500 (FIG. 5) described above and/or the various "Save This" buttons shown in FIGS. 6 and 7. Regardless of how creation of an annotation is initiated, the process for creating the annotation is advantageously the same.

Figure 8:
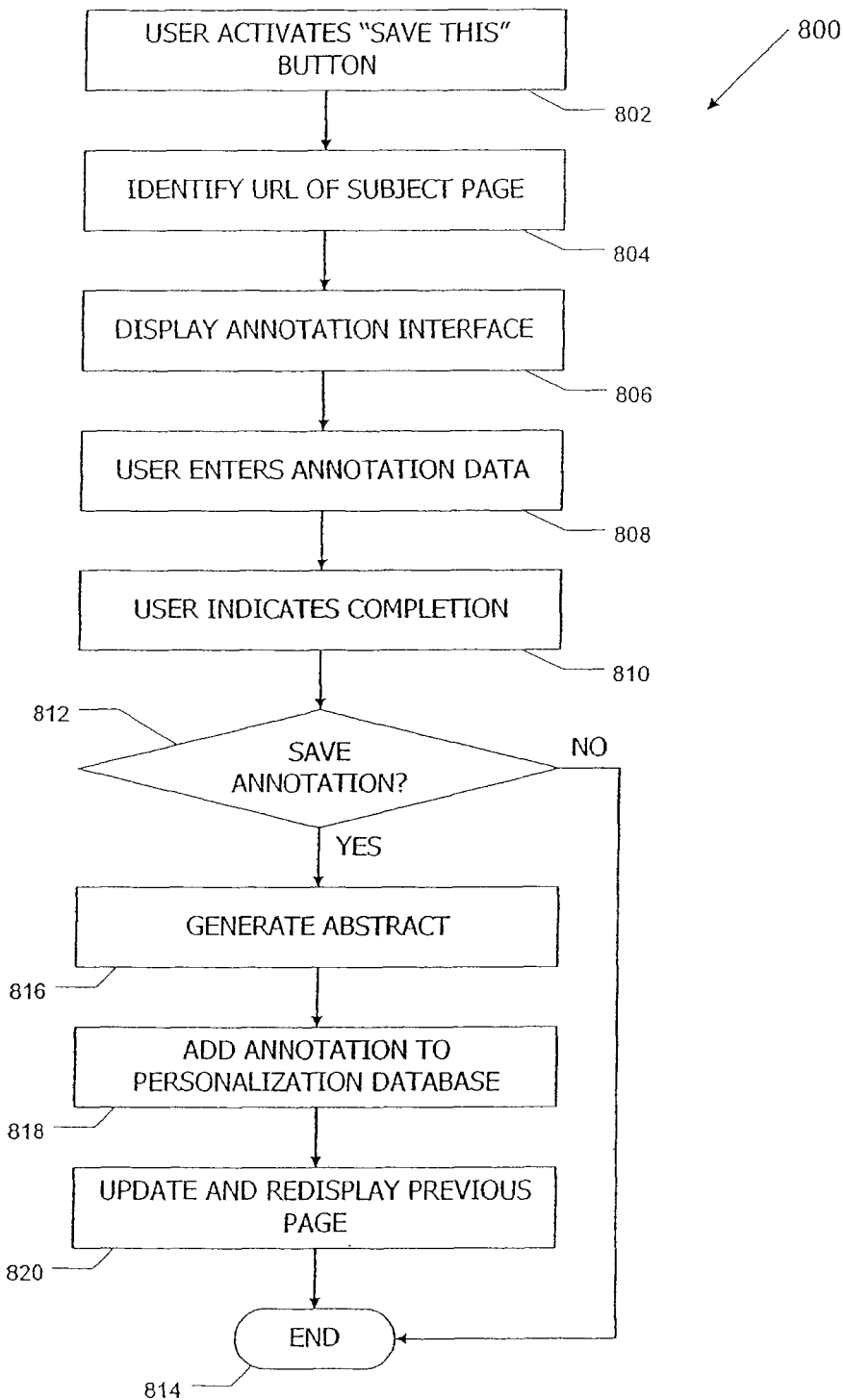
FIG. 8 is a flow diagram of a process for creating an annotation according to an embodiment of the present invention.

FIG. 8 is a flow diagram of a process 800 by which a user creates an annotation for a page (or site) according to an embodiment of the present invention. At step 802, the user activates a "Save This" button, such as button 710 on search toolbar 706 (FIG. 7) or one of the "Save This" buttons 606 on search results page 600 (FIG. 6). At step 804, the server identifies the URL of the page to be annotated (referred to herein as a "subject page").

At step 806, an annotation editing interface for the subject page is displayed. The editing interface is advantageously displayed in a separate window or dialog box that opens when a "Save This" button is activated. In some embodiments, the editing interface is arranged on the user's display in such a way that the user can look at both the subject page and the annotation or easily flip back and forth between the two. At step 808, the user enters annotation information into the interface.

Figure 9:
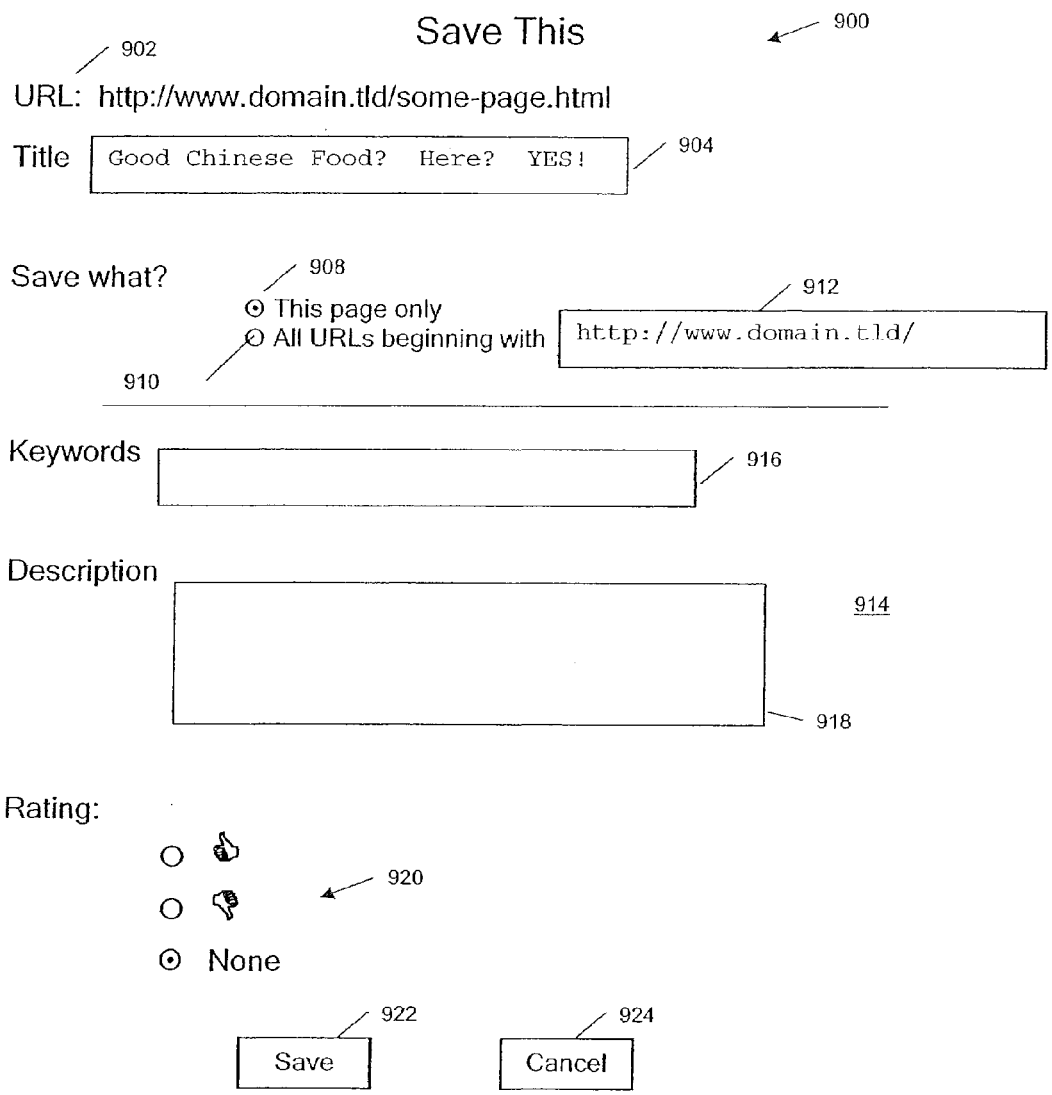
FIG. 9 is an example of a user interface page for creating an annotation according to an embodiment of the present invention.

Various editing interfaces can be used. FIG. 9 is an example of an editing interface page 900 according to an embodiment of the present invention. Page 900 may be displayed at step 802 of process 800. Page 900 displays, in area 902, the URL of the subject page. The URL, which uniquely identifies the subject page, is advantageously pre-populated when page 900 is created and is not user-editable. The page title is displayed in text box 904; box 904 may be filled by default with a page title extracted from the source code of the subject page, and the user may be allowed to edit the title for the annotation by modifying the content of box 904.

In area 906, the user is invited to assign a scope (host flag) to the annotation using radio buttons 908, 910. In one embodiment, the host flag defaults to "page," meaning that the annotation applies only to the URL displayed in area 902. The user can change the host flag to "site" and can also adjust the scope of the site by editing the URL displayed in text box 912 to reflect the intended scope of the site. For example, a host server (identified by the portion of the URL between the double slash and the next slash) might be shared by a number of independent Web sites whose content could be completely unrelated. Where the scope is set to "site," a user might be able to specify a subset of pages on that host server to which the annotation should be applied, e.g., by modifying text box 912 to further specify a directory on the host server that encompasses the desired subset of pages.

Area 914 accepts user input. For example, the user can enter one or more keywords in text box 916. The keywords may be entered, e.g., as a comma-separated list. In some embodiments, keywords may be limited to a maximum number (e.g., 5, 10, 20) or to a maximum number of characters per keyword (e.g., 40, 80), or to a maximum total number of characters. In another embodiment, the user may be able to select one or more labels to be applied to the page or site from a system-supplied list; conventional interface elements for selecting labels from a list can be used. Text box 918 is available for free-form text entry and advantageously accepts a fairly large number of characters (e.g., up to about 5000). The user can also rate the page or site using rating radio buttons 920. In one embodiment, the default is no rating, and the user can change the default by selecting a different one of buttons 920. In preferred embodiments, the user is not required to complete all of the fields in section 914.

Referring again to FIG. 8, at step 810, the user indicates that the new annotation is complete. For example, in interface 900 of FIG. 9, the user indicates completion by activating either a "Save" button 922 and "Cancel" button 924. "Save" button 922 indicates that the completed annotation should be saved, and "Cancel" button 924 indicates that the annotation should be discarded.

At step 812, it is determined whether the annotation is to be saved, e.g., whether the user activated "Save" button 922 or "Cancel" button 924. If the annotation is not to be saved, process 800 exits (step 814). If the annotation is to be saved, then at step 816, an abstract for the annotation is automatically generated. In one embodiment, the abstract is generated by using the user-supplied keywords and/or description to identify the most relevant portion(s) of the page content. This algorithm can be similar to conventional algorithms for generating abstracts for search hits based on query terms. At step 818, the new annotation is added to personalization database 166. Step 818 may include creating a database record; populating the record with information supplied via editing page 900; compressing the annotation data for efficient storage, search and retrieval; and so on.

At step 820, the page the user was viewing when she activated the "Save This" button is redisplayed. In preferred embodiments, the redisplayed page (or the search toolbar) is updated to reflect the existence of the new annotation. For example, in the case where the user activated a "Save This" button 606 on search result page 600 (FIG. 6), the search result page 600 is updated based on the annotation, as described below. Where the user activated "Save This" button 712 of search toolbar 706 (FIG. 7), "Show My Comments" button 714 can become active to indicate that the new annotation exists.

It will be appreciated that the process for creating annotations and the editing interface described herein are illustrative and that variations and modifications are possible. Process steps described as sequential may be executed in parallel, order of steps may be varied, and steps may be modified or combined. In some embodiments, the user may be able to activate a "Save This" button or similar button before the user's identity is known to search server 160. In that event, search server 160 may prompt the user to log in before displaying the editing interface.

In one embodiment, client application 125 (FIG. 2) includes an annotation creation module that displays page 900 or another user-editable form for supplying annotation data, and user annotation module 164 of search server 160 does not participate in process 800 until the user chooses to save the annotation. At that point, if the user is not logged in to search server 160, she may be prompted to log in so that the annotation can be associated with her user ID.

Figure 11:
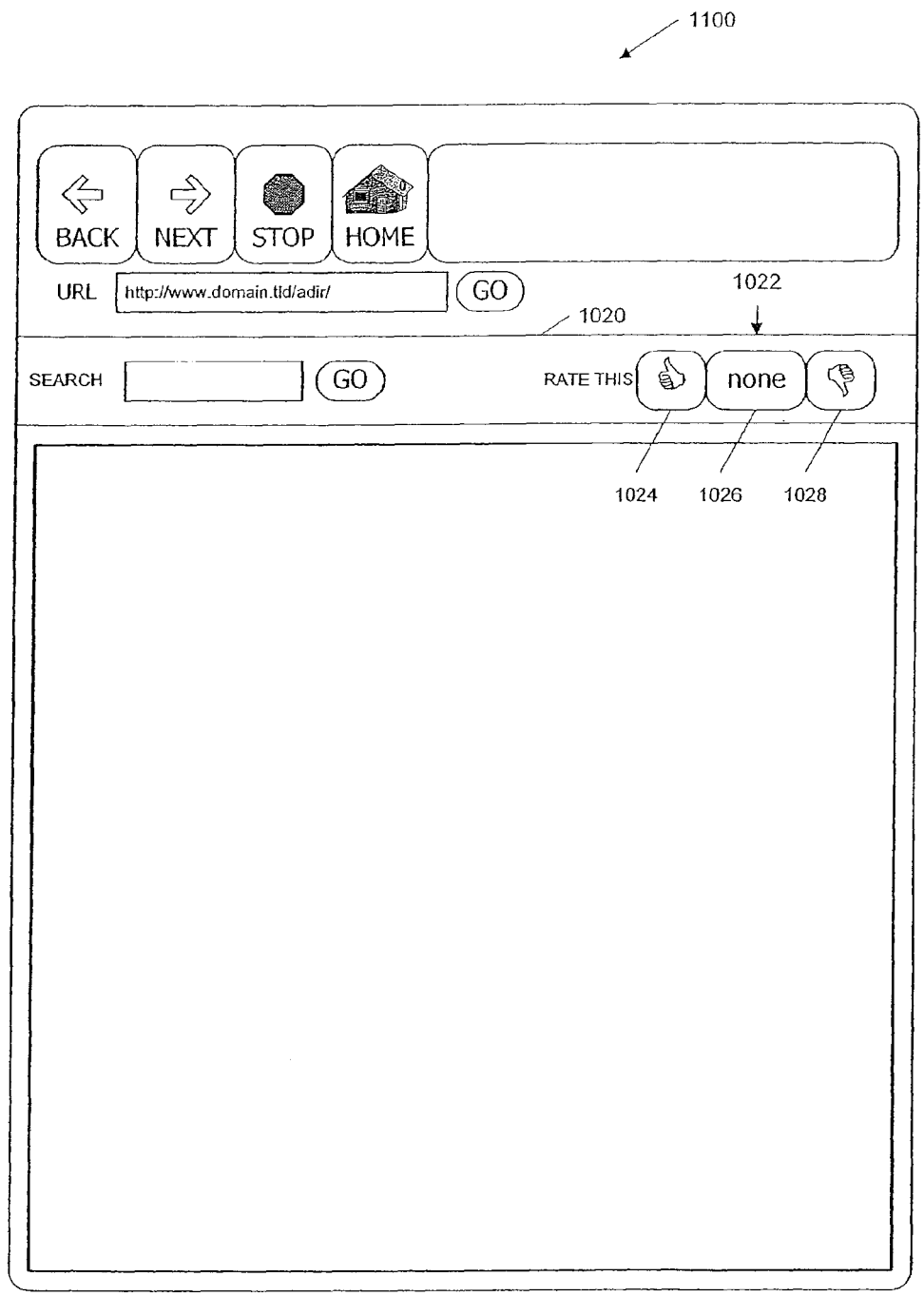
FIG. 11 is an example of a search toolbar for a Web browser according to another embodiment of the present invention.

The annotation editing interface advantageously conforms to the particular content of the annotation data structure in a given embodiment. For instance, FIG. 10 is an example of an in-line annotation editing interface 1000 that allows the user to enter a rating for a search hit. Interface 1000 is integrated in-line into a search results page 1002. The user is invited to rate each hit using one of buttons 1004, 1006, 1008. (If the user does not select a rating, the page is not annotated.) Similarly, FIG. 11 is an example of a browser window 1100 with a toolbar-based annotation editing interface 1020 that allows the user to enter a rating for a page being viewed. Interface 1020 is part of a search toolbar 1022, which can be generally similar to search toolbar 706 of FIG. 7 described above. Interface 1020 appears when the user is viewing an unannotated page and includes button 1024, 1026, 1028 for entering a favorable, neutral, or unfavorable rating. It is to be understood that different interfaces adapted to different rating schemes could be substituted. Different interfaces could also be combined; for instance, the user could enter a rating and then be invited to provide additional metadata.

IV. Search Using Annotation Data

Once collected, annotation data can be used in various ways to enhance the user's searching and Web browsing experience. Examples of such enhancements will now be described; it is to be understood that the use of annotations is not limited to any particular feature or set of features.

A. Enhanced Web Search

In one embodiment, search server 160 accesses a user's library of annotations to provide additional information on a search results page generated in response to a query from that user. For example, a separate list of annotated hits (i.e., hits that correspond to annotated pages in the user's library) may be included in the search results, or annotated hits may be highlighted wherever they happen to appear in the results list. Where the annotations include ratings, a separate list of favorably-rated hits might be provided, rated hits might be highlighted in a manner that reflects the querying user's ratings, or ratings data might be used as a factor in ranking the hits.

Figure 12:
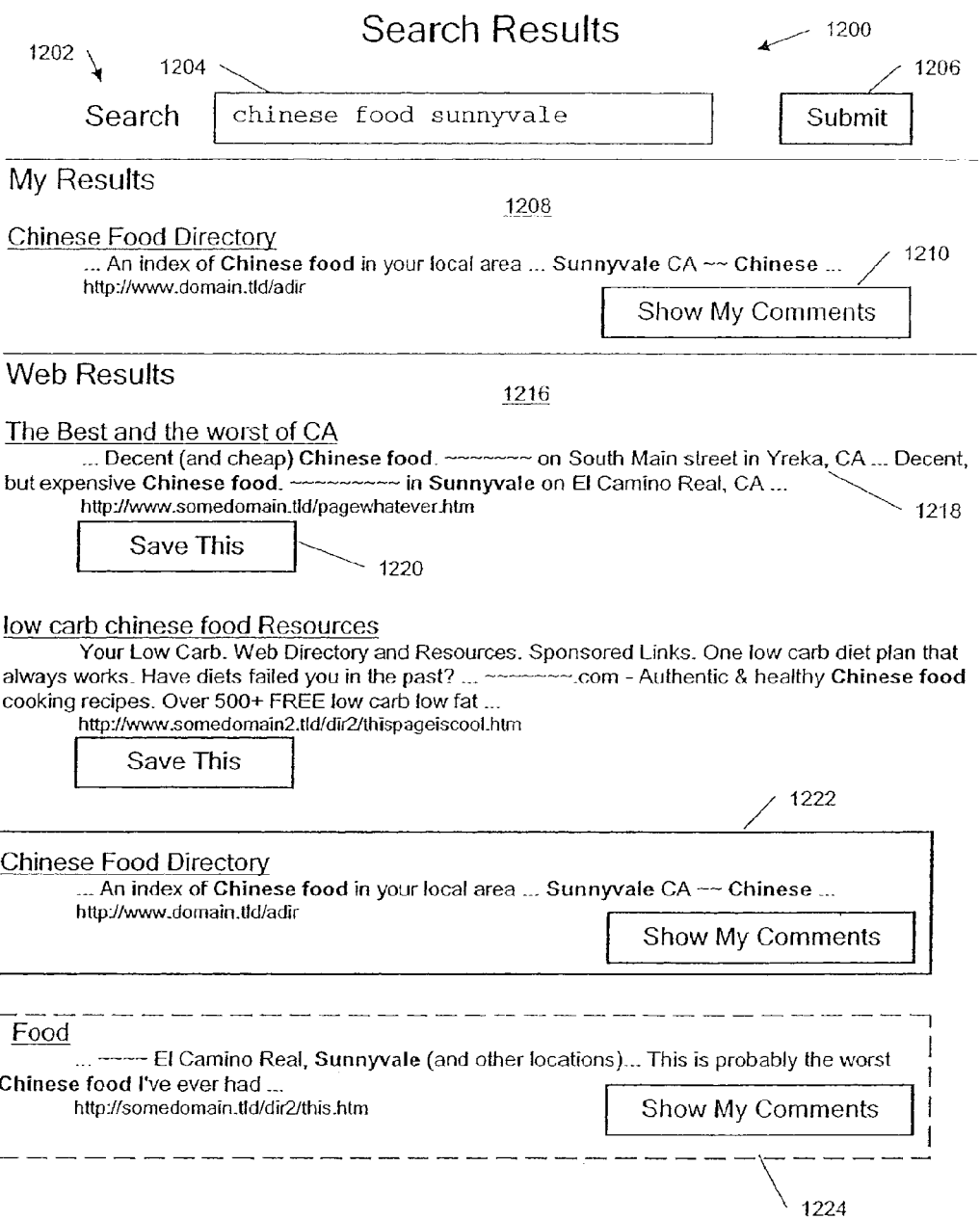
FIG. 12 is an example of another search results page according to an embodiment of the present invention.

FIG. 12 is an example of a search results page 1200 enhanced with annotation information according to an embodiment of the present invention. Results page 1200 might be generated by query response module 162 in response to a user's query. In this embodiment, results page 1200 includes a banner section 1202. In addition to page identifying information, banner section 602 includes a search box 1204, which shows the current query (e.g., "chinese food Sunnyvale") in editable form together with a search button 1206 enabling the user to change the query and execute a new search. These features may be of generally conventional design.

Section 1208 is a personalized results area ("My Results"), in which any hits that the user has previously annotated are displayed. In some embodiments, section 1208 may show only results for which the user's annotation included a favorable rating; in other embodiments, all annotated pages may be listed in section 1208. Each page is advantageously accompanied by a "Show My Comments" button 1210 that the user can activate to view her previous annotation. In some embodiments, hits may be highlighted based on the ratings (if any) the user has assigned to various sites.

Figure 13:
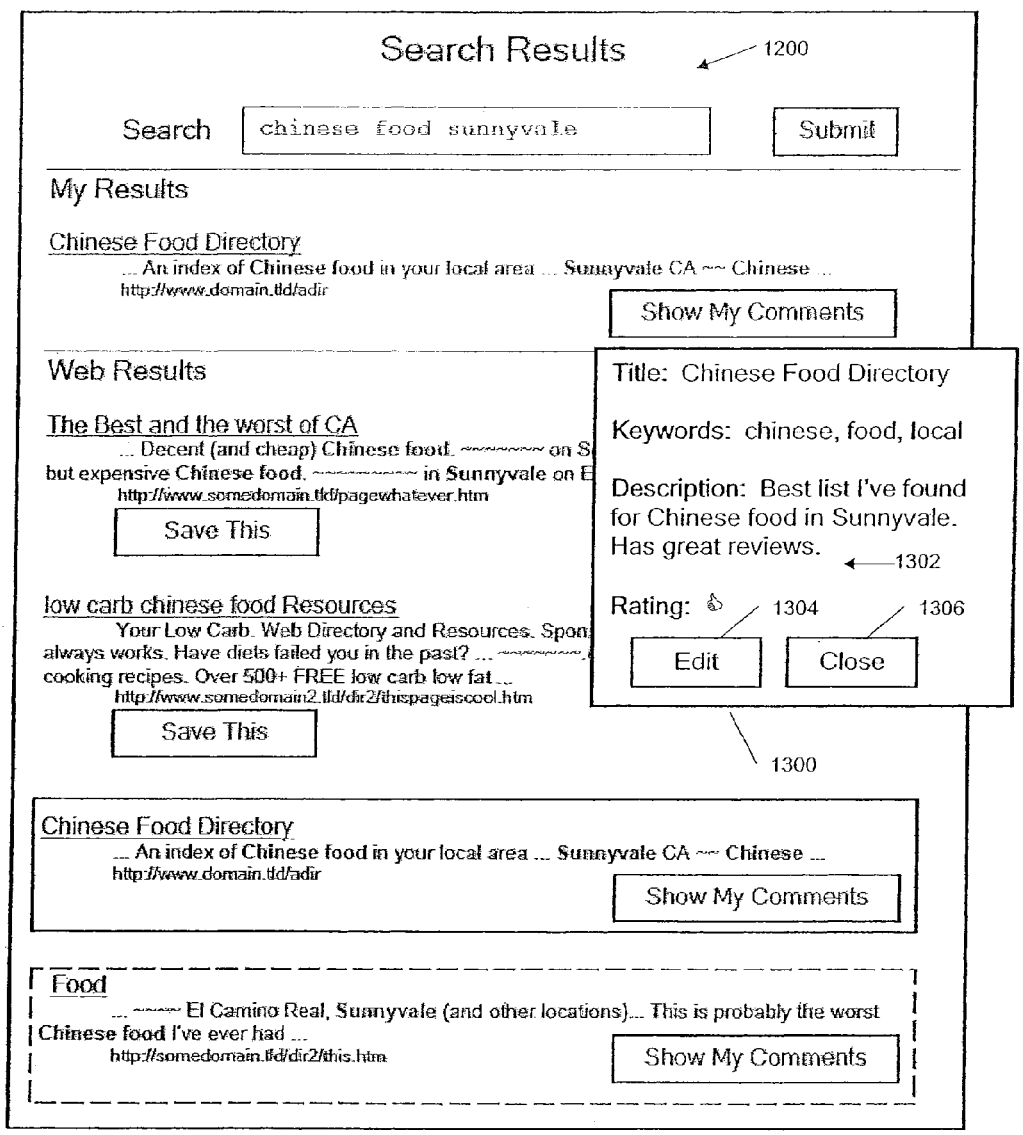
FIG. 13 is an example of a page overlay displaying an annotation according to an embodiment of the present invention.

FIG. 13 is an example of an annotation view page 1300 that may be generated when a user activates button 1210. Annotation view page 1300 is advantageously an overlay (e.g., a pop-up window) displayed over page 1200 such that page 1200 is at least partially visible. In some embodiments, page 1300 is displayed as an overlay over the annotated page itself rather than page 1200. In other embodiments, the annotation may be displayed in-line in page 1200 or in-line with the annotated page. Where the annotation includes metadata (e.g., a description) connected to a specific portion of the page content, such metadata may be displayed overlaying or near (e.g., immediately before or immediately after) the part of the page to which it is connected.

Page 1300 includes, in section 1302, the title, description, keywords and ratings retrieved from the annotation stored in personalization database 166. "Edit" button 1304 allows the user to edit the annotation; in one embodiment, activating button 1304 opens editing interface 900 (FIG. 9), and the various text blocks and other elements of editing interface 900 may be pre-populated using the current content of the annotation. "Close" button 1306 closes page 1300.

Referring again to FIG. 12, results section 1216 displays some or all of the hits with a ranking determined by query response module 162. Conventional ranking algorithms may be used to generate this ranking. Each entry 1218 in section 1216 corresponds to one of the hits and includes the title of that page (or site) and a brief excerpt (or abstract) from the content of that page. Excerpts or abstracts may be generated using conventional techniques. The URL (uniform resource locator) of the site is also displayed. For hits that the user has not annotated, a "Save This" button 1218 may be displayed, and while viewing page 1200, the user may elect to annotate an unannotated hit by activating a button 1218. "Save This" button 1218 is advantageously the same as button 606 in FIG. 6 above.

Any hits in section 1216 that the user has annotated may be visually highlighted to indicate the existence of the annotation. Various designs for highlighting may be used, including, e.g., borders, shading, special fonts, colors or the like. In some embodiments where the annotations include ratings, the type of highlighting depends on the rating, and the rating may be displayed on page 1200. For example, hit 1220 has a favorable rating while hit 1222 has an unfavorable rating.

In one embodiment, annotations entered by a user while viewing a results page are used in real time to update the displayed results for the current query, in addition to storing the information in personalization database 166 for future use. Thus, if the user viewing page 1200 activates a "Save This" button 1218, thereby initiating process 800 (FIG. 8) described above, the redisplayed page 1200 can be modified to reflect the new annotation. For example, the newly annotated hit might be highlighted, or results might be reranked using a rating newly given to the hit.

Figure 14:
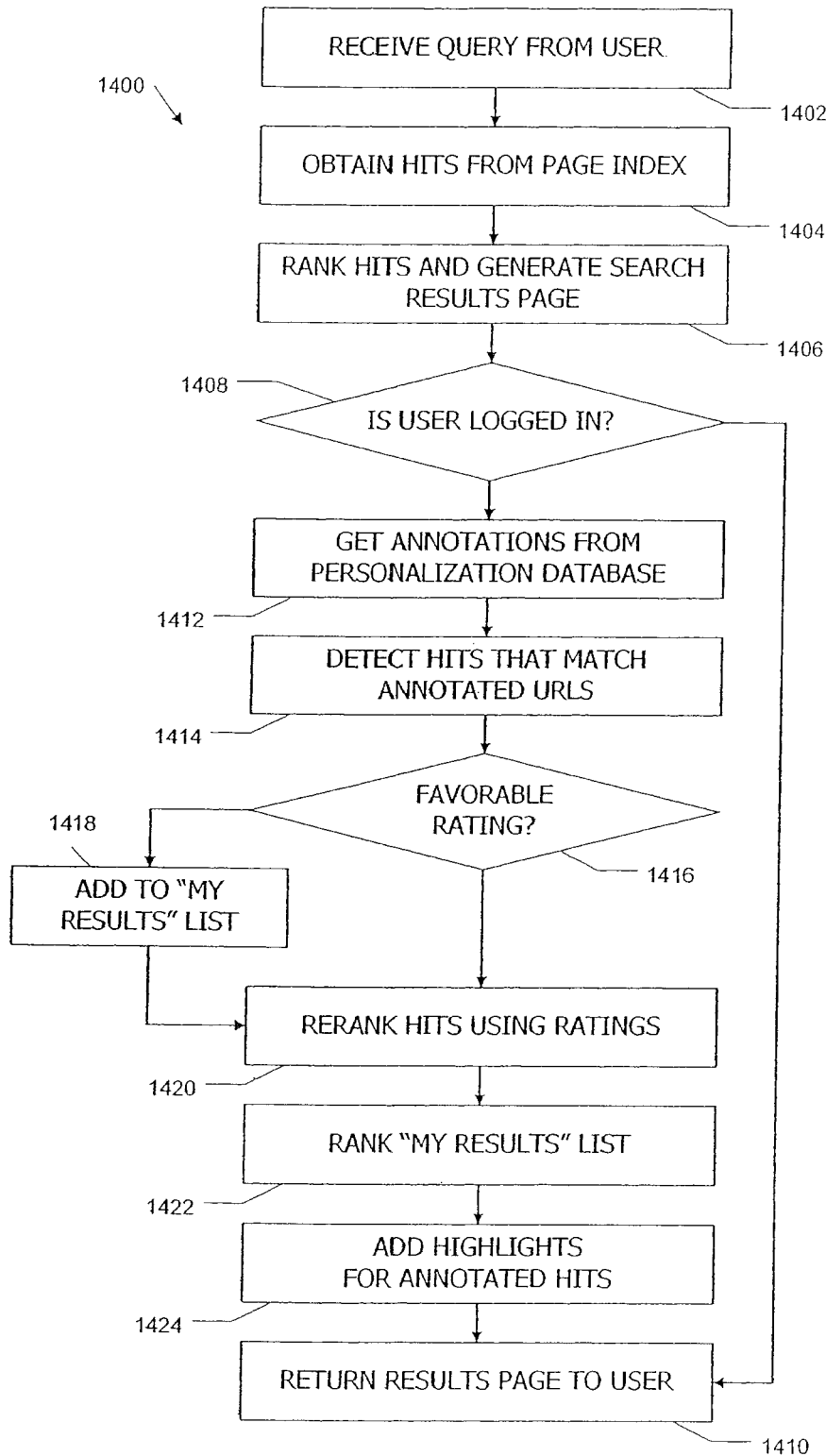
FIG. 14 is a flow diagram of a process for executing a search according to an embodiment of the present invention.

FIG. 14 is a flow diagram of a process 1400 that may be implemented in query processing module 162 (FIG. 2) for incorporating a user's previously stored annotations into a response to a current query from that user. At step 1402, the query is received. At step 1404, a list of hits corresponding to the query is obtained, e.g., from page index 170 (FIG. 2). At step 1406, query processing module 162 ranks the hits, e.g., using conventional algorithms.

At step 1408, query processing module 162 determines whether the user is logged in. If not, query processing module 162 may send the results page to the user without personalization at step 1410, enabling users to perform searches and obtain results without logging in to (or even being registered with) search server 160. If the user is logged in, then the results page is customized for that user based on information in personalization database 166.

More specifically, at step 1412, query processing module 162 provides the user's ID to personalization database 166 and retrieves the annotations created by that user. At step 1414, the URLs of the retrieved annotations are compared to URLs of the hits to detect any hits that match URLs for which the user has previously created annotations. For annotations whose host flag is set to "site," a match (also referred to herein as a "partial match") is detected if the beginning portion of the hit URL matches the URL (or partial URL) stored in the annotation (e.g., in URL field 308 in FIG. 3). If the host flag is set to "page: an "exact" match between the URL of the annotation and the hit URL is required. For each partial or exact match, it is determined at step 1416 whether the annotation includes a favorable rating, e.g., by reference to "rating" field 328 of annotation 300. If so, then the hit is added to the favored results ("My Results") list. In other embodiments, all annotated hits, regardless of any rating, might be added to the "My Results" list.

At step 1420, after comparisons between hits and annotations are completed, the results list is optionally reranked using ratings contained in the annotations. For example, a base score can be generated for each hit (whether it has an annotation or not) using a conventional ranking algorithm. For hits that have an annotation with a favorable or unfavorable rating, a "bonus" can be determined from the rating. The bonus is advantageously defined such that favorably rated sites tend to move up in the rankings while unfavorably rated sites tend to move down. For instance, if low scores correspond to high rankings, the bonus for a favorable rating may be defined as a negative number and the bonus for an unfavorable rating as a positive number. In some embodiments, partial URL matches may be given a smaller bonus than exact URL matches. Unrated (or neutrally rated) hits would receive no bonus. This bonus can be added (algebraically) to the base score to determine a final score for each hit, and reranking can be based on the final score.

In some embodiments, reranking at step 1420 may also include dropping any hits that match unfavorably rated pages or sites from the list of hits to be displayed. In such embodiments, the search results page delivered to the user may include an indication of the number of hits that were dropped due to unfavorable ratings and/or a "Show all hits" button (or other control) that allows the user to see the search results displayed with the unfavorably rated hits included. In another variation, the user can click on a link to see just the unfavorably rated hits.

At step 1422, the "My Results" list is ranked and added to the search results page. In some embodiments, this ranking may be based on the base score or final score described above. In other embodiments, hits in the "My Results" list are sorted by user rating; hits with the same rating may be further sorted according to the base score described above. At step 1424, the search results page is modified to indicate the existence of any annotations; e.g., highlighting and/or "Show My Comments" buttons may be added to the annotated hits. The modified search results page, in this case including the personalized "My Results" section, is sent to the user at step 1410.

It will be appreciated that the process described herein is illustrative and that variations and modifications are possible. Steps described as sequential may be executed in parallel, order of steps may be varied, and steps may be modified or combined. In some embodiments, some or all of the content of the annotation might be displayed in-line in the search results page prior to viewer action. For instance, a visual highlighting element that indicates a favorable or unfavorable rating can be displayed, or the user's keywords or description might appear under the automatically generated abstract, and so on. Where the annotation's content is displayed in-line, a "Show My Comments" button (or other control element allowing the user to view the annotation) may be omitted.

In other embodiments, a user's annotations may be used to identify hits during a search operation. For example, in addition to searching page index 170, query response module 162 may also search selected fields of the user's annotations using some or all of the same search terms used to search page index 170. In one such embodiment, the keywords and description fields of the annotations are searched, and an annotated page is identified as a hit if the search terms appear in one of these fields, regardless of whether the annotated page was identified as a hit in the search of page index 170.

In still other embodiments, inferences can be made about the relative importance of different annotations (or different annotated pages) to the user and used in organizing the presentation of the search hits. For example, it may be inferred that annotated pages that the user accesses more frequently are more valuable to that user than pages accessed less frequently. Thus, when one of the user's most frequently accessed pages appears in a search result, that page might be displayed more prominently (e.g., moved up in the rankings), marked with a special indication distinct from the normal annotated page indicator, or included in a special "favorites" area.

In some embodiments, the annotations used in responding to a query may be limited to a subset of the user's annotations. For instance, only annotations in folders for which the active flag is set to "true" might be used for identifying hits and/or highlighting results.

B. Search in the User's Library

In other embodiments, the user can search her personal library of annotated content rather than the entire Web. For example, "My Library" page 500 of FIG. 5 includes a "Search My Library" button 540 that can be used to initiate a search of the user's library. Although not explicitly shown, a similar button can also be included on toolbar 706 of FIG. 7. Activating a "Search My Library" button advantageously launches a library search interface page via which queries can be directed to the user's library.

Figure 15:
FIG. 15 is an example of a search interface page for searching a library of annotations according to an embodiment of the present invention.

FIG. 15 is an example of a library search interface page 1500 according to an embodiment of the present invention. Page 1500 provides a user interface for field-specific searching within all of the user's library of annotated pages or sites or within any subset of the user's library. Scope section 1502 supports selection of the pages to search. In this instance "All Pages" option 1504 (which may be the default) is selected, and all pages that the user has annotated will be searched. If "Selected Folders" option 1506 is chosen, area 1508 would provide a list of folders with each folder having a checkbox or other selection/deselection toggle. Similarly, if "Selected Pages" option 1510 is chosen, area 1508 would provide a list of annotated pages (which may be initially displayed as an expandable list of folders) with each page having a checkbox or other independent selection/deselection toggle. Pages can be identified by title, URL, or any other field(s) from the user annotation. In another embodiment, the user may opt to search only those portions of the library (folders and/or individual annotations) for which the "active" flag is set to true or to search all library contents without regard to the active flag.

Query section 1512 provides various text boxes into which the user can enter search terms for searching page content and/or searching particular fields in the annotation. In this example, the user can separately specify search terms for the page content (box 1514), annotation title (box 1516), keywords field (box 1518), description (box 1520), and/or referral (box 1521). Radio buttons 1522 can be used to constrain a rating of the hits. By default, "Any rating" is selected, so that the rating (or absence thereof) does not limit the search; the user can opt to limit the search, e.g., to hits with favorable ratings or to hits with unfavorable ratings. "Search" button 1526 submits the query for processing, and "Reset" button 1528 clears all fields in query section 1512.

Processing of the search depends on which boxes in query section 1512 provide search terms. Where the page content is to be searched, data can be obtained either from page index 170 or from the annotation in personalization database 166 if a representation of the page content is stored therein. Other fields are searched using the user's annotations in personalization database 166. It is to be understood that the user may leave some or all of the boxes in section 1512; where a box is empty, the corresponding field is not used to constrain the search. For example, the user could search the page content of her annotated pages by entering search terms in box 1514 and leaving the other boxes empty; the actual search could be performed using page index 170, with any hits that do not correspond to an annotated page or site being discarded before transmitting the results to the user. Results of the search are advantageously delivered using a search result page similar to page 1200 (FIG. 12) described above, except that in searches limited to the user's library, every page has an annotation.

The query interface may be varied. For example, in another interface, a single text box is provided, and the user is prompted to select whether search terms in the text box should be searched in the page contents and/or in various fields of the annotation record (e.g., title, keywords, description, and/or other fields). In still another embodiment, a "basic" search interface with a single text box is provided by default, and the search is performed over the page content and the annotation fields. The user can accept this basic search configuration or opt to view query section 1512 (or another query interface) to perform a more advanced search. Other query interfaces and combinations of interfaces are also possible.

In embodiments where users can search their annotations by keywords, a user can advantageously develop a personalized keyword scheme for indexing content she discovers on the Web. Using the search and/or toolbar-based interfaces described above, the user can by creating an annotation, assign keywords to any page she finds interesting and add the page to her personal library. Later, the user can search using the keywords field to find the pages in her library related to a particular subject. Thus, searchable annotations provide a powerful tool for individual users to organize and classify Web content in a manner that is useful to them.

It will be appreciated that search page 1500 is illustrative and that variations and modifications are possible. In some embodiments, search page 1500 may also be accessible via a button on a toolbar or other suitable element of a persistent user interface, or from a search provider's main page. If a user who is not logged in to search server 160 attempts to access page 1500, the user may be prompted to log in before page 1500 is displayed.

C. Search for Related or Similar Pages

In some embodiments, users can also search for other documents (e.g., pages or sites) that are similar to or related to pages or sites in their libraries. "Similar" documents are documents that contain content meeting some similarity criterion relative to an annotated page. Examples of similarity criteria include: having some number of words, phrases, or other multiword units in common; having similar patterns of occurrence of words, phrases or other multiword units; belonging to the same category or closely related categories in a system-defined taxonomy; or the like. Algorithms for determining similarity between two pages are known in the art and may be used with the present invention. "Related" documents share portions of a URL (e.g., at least a domain name) with the rated page; again, known algorithms for determining relatedness may be used.

In one embodiment, from search page 1500 (FIG. 15), the user can select all or any subset of her annotated pages using scope section 1502 as described above, then activate button 1536 to search for similar documents or button 1538 to search for related documents. Searches for similar or related documents are advantageously not limited to annotated pages or sites and can be performed by search server 160 using page index 170. In some embodiments, searches for related or similar pages can also include search term qualifiers, and search terms may be specified using query section 1512 as described above or other interfaces. In some embodiments, the relative frequency with which a user accesses different annotated pages within the selected subset can be used to assign different weights to different annotated pages in the active subset for purposes of determining which other documents are most similar or most closely related to the selected documents; more frequently accessed pages are advantageously assigned a higher weight than less frequently accessed pages.

D. Iterative Search Using Annotations

The above-described techniques can be leveraged to support iterative search workflows in which users can filter annotated pages or sites to create subsets and perform further filtering on the subset. For example, the folders available to a user may include a "Working" folder that is automatically created and used to support iterative search. A user may search all of her annotated pages (e.g., by using search interface 1512 of page 1500) with a desired query term in Referral box 1521. The user can then review the results and save any interesting ones to the "Working" folder, with or without filling in the various annotation fields. In one embodiment, search results page (see FIG. 12) may also include an "Add to Working Folder" button.

In another embodiment, the "Working" folder can also be populated as the user navigates the Web using the browser. For instance, an "Add to Working Folder" button may be provided via a toolbar (e.g., toolbar 706 of FIG. 7) or other persistent interface. The user may also be able, via a suitable interface, to move or copy annotation records from other folders to the Working folder and to edit the contents of the Working folder directly (e.g., via page 500 of FIG. 5). In still another embodiment, the user initially searches the entire Web using some query, then populates the "Working" folder from the search results page, e.g., by adding some or all of the hits to the folder. An interface element to empty the "Working" folder may be included in page 500, or in a toolbar or other persistent interface as desired.

After populating the "Working" folder, the user can execute a further query, e.g., via page 1500 of FIG. 15, selecting just the "Working" folder. In some embodiments, the user can save all of the results of a search in the "Working" folder to some other folder (which may be, e.g., a new user-created folder) by activating an appropriate interface button. These results are available for browsing or further searching. In some embodiments, the user may save searches conducted on the "Working" folder as filters that can be applied to other pages or search results.

E. Toolbar Enhancements

In some embodiments, a browser toolbar, such as toolbar 700 (FIG. 7) described above, can be enhanced based on user annotations. For example, as described above, toolbar 700 advantageously provides a "Show My Comments" button 714 that indicates whether the user has already annotated the current page and that allows the user to view her annotation, e.g., in a pop-up window or overlay as shown in FIG. 13 and described above. Annotations can also be displayed in-line in the annotated page.

In other embodiments, further toolbar enhancements are provided. For instance, in some embodiments, annotations are integrated with a "Bookmark" feature. As is known in the art, browser toolbar add-ins provided by some Internet portal providers include a "Bookmark" feature that allows registered users of the portal service to save bookmarks to pages as they browse. Each bookmark generally includes the URL and, in some instances, a page title. The user can access her bookmarks using any Web browser client that has the toolbar add-in installed, provided that the user first logs in to search server 160.

Annotations, in some aspects, can be used as enhanced bookmarks. Instead of just bookmarking a page, the user can save additional information (metadata) about the bookmarked page, such as keywords, ratings, or other descriptive and/or evaluative information. This information may, for instance, remind the user of what she thought was interesting or worthwhile about the page or site in question. Further, instead of trying to remember which of tens or hundreds of bookmarked page included a particular item of information, the user can search her library of annotations to find a desired page.

In some embodiments, a list of conventional bookmarks for the user is automatically generated from her library of annotated pages or sites (or just from those annotated pages or sites with a favorable rating). The user can choose not to enter any content when creating a new an annotation; in this case, the annotation would operate essentially as a conventional bookmark.

F. User Preferences

In some embodiments, registered users may be able to control the uses made of their annotation data. For example, "My Library" page 500 (FIG. 5) may include an "Options" button 550. Button 550 advantageously links to a preferences page (not explicitly shown) that enables the user to specify her preferences for various annotation-related features. Examples include whether the user's ratings should or should not be considered in generating search results, whether "global ratings" (described below) should be considered in generating search results, whether and how any of the user's annotations are to be published, and so on.

User preferences for these and any other options are advantageously stored in personalization database 166 and applied whenever the user logs in. In some embodiments, buttons and options controllable from search results pages (e.g., as described above) may temporarily override the user preferences specified via a user preferences page; the original preferences can be restored for the next query or the next time the user logs in.

V. Aggregation of Annotation Data

In some embodiments, search server 160 uses aggregated annotation data across the entire community of registered users to enhance the search experience for all users. Examples will now be described.

A. Global Ratings

For example, the ratings assigned to a page or site by different users can be averaged or otherwise aggregated to generate a "global" rating for that page or site. In one such embodiment, search server 160, or another server operated under common control with search server 160, periodically (e.g., once per day) executes an algorithm that searches the annotations in personalization database 166 by URL to collect all ratings that any user might have assigned to the page or site having that URL. These ratings are then averaged or combined in some other manner to determine a global rating for the page or site. The global rating may be cached, e.g., in page index 170.

Global ratings may be used in various ways. In one embodiment, the global rating of a page or site may be used as a factor in the search-results ranking algorithm when the URL of the page or site matches a hit for a given search. In another embodiment, the global rating may be displayed next to each hit on a search results page, along with the user's own rating (if the user has given one), regardless of whether the global rating is used in the page ranking.

In some embodiments, the user may have the option to show or hide global ratings, and/or to use or ignore global ratings when ranking search hits. Controls for such options may be included on a search results page or on a user preferences page as described above.

B. Folksonomy

As another example, aggregated annotation data may be used to classify or categorize Web content to create a "folksonomy." As used herein, a "folksonomy" refers to a system of classification for content that is based on and reflective of the way in which a community of users chooses to describe and classify the content. In embodiments where annotations include keywords (or labels), the pattern of keywords assigned to a particular page will tend to be indicative of its content. For instance, if 50% of the users who annotated a particular page used the keyword "cycling," then it can be inferred that the page relates to cycling.

In one such embodiment, search server 160, or another server operated under common control with search server

160, periodically (e.g., once per day) executes an algorithm that searches the annotations in personalization database 166 by URL to find all keywords that have been used to annotate that URL by registered users. Search server 160 analyzes the patterns of keywords to determine a set of "folksonomy keywords" for the page. This set may include, e.g., the most frequently used keywords (e.g., up to 5 or 10 or some other maximum number), the most recently used keywords, or the like. In some embodiments, a combination of frequency and recency is used to select the folksonomy keywords. Folksonomy keywords for a particular page can be added to page index 170 in association with the URL and used in responding to subsequent searches. For instance, a URL might be returned as a hit for any query (from any user) if one of the folksonomy keywords for the URL matches a search term of the query, regardless of whether the page content actually includes any of the search terms. Ranking of hits may depend in part on whether the search terms matched page content, folksonomy keywords, or both.

In some embodiments, users (either registered users or all users) can choose whether to search the folksonomy keywords instead of or in addition to page content.

C. Identifying User Interests

User annotations may also be used by the search provider (e.g., the owner of search server 160) to develop user profiles. For example, annotated pages or sites may be classified into categories using various proprietary or non-proprietary classification schemes, including the folksonomy keywords described above, or they may be classified based on the keywords a particular user has assigned. By analyzing the categories to which a user's various rated pages or sites belong, the search provider can identify subjects in which the user is particularly interested. For instance, if a user has annotated many pages that belong to a single category, it can be inferred that the user is generally interested in content in that category. The search provider may also use statistics about which annotated pages the user visits most often as a further aid in identifying a user's interests.

The search provider can use information about a user's interests gleaned from the annotations in various ways to enhance the user's experience. In one embodiment, knowledge of a particular user's interests can be used to resolve ambiguities in search queries received from that user, including queries for which the search is to be conducted over the entire Web and/or queries for which the search (or search hits) is limited to the user's library. For instance, the term "jaguar" in a search query might refer to an automobile or to an animal. If the user has annotated relatively many sites related to automobiles and relatively few related to animals, it can be inferred that this user is more likely interested in the automobile than the animal. This information can be used to enhance the likelihood that information relevant to the user's actual interest will receive prominent placement in the search results, e.g., by adjusting page rankings based on whether the page relates to an identified user interest.

As another example, knowledge of a particular user's interests can be used to customize Web content for delivery to that user. In one embodiment, a user's interests can be used in determining how to arrange content on a Web page; for example, a news page requested by a user might be arranged so that stories related to that user's known interests appear first. In another embodiment, a user's interests are taken into account when selecting sponsored content (e.g., advertisements) for displaying on a Web page. Other types of customization based on a known interest of a particular user can also be performed.

Information about user interests obtained from annotations can also be aggregated across subgroups of users (e.g., all users, or users fitting some geographic or demographic profile). In situations where the user's identity or particular interests are not known, this aggregate information can be used for purposes such as resolving ambiguity in search queries, selecting and arranging content of a Web page, and so on. In some embodiments, aggregations across different subgroups of users are performed in parallel and used in situations where only partial information about the user (e.g., the user's geographic location or a demographic characteristic) is known.

In other embodiments, a search provider might also use aggregate information about user interests in making other strategic decisions, such as setting advertising rates, determining content or layout of portal pages, and the like.

D. Inferring Opinions

In some embodiments where a user's annotation for one page or site includes a rating, search server 160 can infer the user's likely opinion of other (unannotated) pages or sites from that rating. Such inferences might be based on relatedness of the URL and/or similarity of content between the annotated page and the unannotated page. Similarity of content can be determined, e.g., based on titles, abstracts, patterns of word use in the content, categorization (based on the folksonomy keywords or other classification schemes), etc. The unannotated page can be assigned an inferred rating, e.g., based on the user's average rating of annotated pages or sites that are determined to be similar.

Where inferred ratings are used to rank search hits, the inferred ratings should be accorded less weight than direct ratings, reflecting uncertainty about the inference. For example, if a user gave a negative rating to page or site X, the same rating might be inferred for another page or site Y that is similar to or related to page or site X. The direct negative rating might cause page or site X to be removed from the search result list, while the inferred negative rating of page or site Y might result in page or site Y being included in the result list but with a lower ranking than it otherwise would have.

In some embodiments, the weight is determined based in part on how many pages (or sites) having that property the user has rated and how consistent the ratings given to such pages are. For instance, if the user has consistently given negative ratings to a large number of pages belonging to a particular category, the inferred negative rating of an unannotated page belonging to that category might be weighted more strongly than if the user had given ratings to only one or two pages in that category.

In another embodiment, the weight is also based in part on the degree of similarity between the annotated and unannotated pages. For instance, if the pages are nearly identical in content, the inference of a similar rating can be accorded a higher weight than if the similarity is less strong.

VI. Further Embodiments

While the invention has been described with respect to specific embodiments, one skilled in the art will recognize that numerous modifications are possible. For instance, the appearance of various search result and user interface pages or windows may differ from the examples shown herein. Interface elements are not limited to buttons, clickable regions of a page, text boxes, or other specific elements described herein; any interface implementation may be used.

It should also be understood that in its rating-related aspects, the invention is not limited to any particular rating scheme, and some embodiments might offer users the option of choosing among alternative rating schemes (e.g., thumbs up/thumbs down or rating on some scale). In some embodiments, only favorable or neutral ratings might be supported. In other embodiments, ratings might not be collected at all.

Annotations can include any number of fields in any combination and may include more fields, fewer fields, or different fields from those described herein. For example, in some embodiments, the user may be invited to create an abstract or to edit an automatically generated abstract. In another embodiment, the user may be prompted to indicate whether a page or site being annotated belongs to some general category of content, e.g., "adult" or "foreign" or "spam." The user can then choose to include or exclude content in that category during searches. In addition, information about which pages or sites different users have categorized in one or another of these categories can be used to infer that the page or site in question should be treated as such. Thus, for instance, if a large number of users identify a particular page as spam, that page might be excluded from future search results.

Other interfaces for viewing and interacting with annotations may also be provided. For example, in some embodiment, the browsing user's annotation data and/or aggregated annotation data can be automatically displayed (e.g., in line with page content or in an overlay) every time an annotated page is displayed in the user's browser. In one such embodiment, each user may be able to indicate preferences for whether their own annotations, aggregate metadata, or both should be automatically displayed.

As described above, some embodiments allow the user to control whether an annotation should apply to a single page or to a group of pages (a site). In addition, in some embodiments, users might also be able to apply an annotation to all pages registered to the same domain name registrant as the rated page. The existence of a common domain name registrant may be determined using WHOIS or another similar service.

In other embodiments, a provider of search server 160 may also offer sponsored links, in which content providers pay to have links to their sites provided in search results. Sponsored links are usually displayed in a designated section of the results page, segregated from the regular search results. In one embodiment of the present invention, any sponsored links that the user has annotated can also be marked. For instance; a sponsored link might have highlighting to indicate that the user has an annotation for that page, and the user's rating (if any) for the sponsored link might be used in determining the highlighting, just as for the regular search results shown in FIG. 12 above. Sponsored links may also be accompanied by a "Save This" button, a "Show My Comments" button, or similar buttons or interface controls.

The embodiments described herein may make reference to Web sites, URLs, links, and other terminology specific to instances where the World Wide Web (or a subset thereof) serves as the search corpus. It should be understood, however, that the systems and methods described herein can be adapted for use with a different search corpus (such as an electronics database or document repository) and that results or annotations may include content as well as links or references to locations where content may be found.

Computer programs incorporating various features of the present invention may be encoded on various computer readable media for storage and/or transmission; suitable media include magnetic disk or tape, optical storage media such as CD or DVD, flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

While the present invention has been described with reference to specific hardware and software components, those skilled in the art will appreciate that different combinations of hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method implemented on a machine having at least one processor, storage, and a communication platform connected to a network for responding to a user query, the method comprising:
   receiving a search query from a user;
   obtaining, from a database, a plurality of hits relevant to the search query;
   identifying, from the plurality of hits, at least one annotated hit that was previously annotated by the user;
   generating a search result page with a first section and a second section, wherein:
      the at least one annotated hit is presented within the first section with a first button that allows for the at least one annotated hit to be edited, and
      the plurality of hits including the at least one annotated hit are presented within the second section, each of the plurality of hits being presented with a second button that allows a corresponding one of the plurality of hits to be edited;
   presenting, in response to an activation of the second button associated with an unannotated hit, an annotated view page that allows the user to annotate the unannotated hit;
   receiving a new annotation directed to the unannotated hit of the plurality of hits to generate a newly annotated hit; and
   updating the search result page by inserting the newly annotated hit into the first section with the first button such that:
      the at least one annotated hit and the newly annotated hit are presented within the first section, and
      the plurality of hits are presented within the second section.

2. The method of claim 1, wherein the at least one annotated hit includes information related to the user's indication of favorability of the at least one annotated hit.

3. The method of claim 1, further comprising:
   displaying, in response to the first button associated with the at least one annotated hit being activated, a first window for editing the at least one annotated hit;
   receiving, from the first interface, a user edition of information associated with the at least one annotated hit;
   re-ranking synchronously the at least one annotated hit in the first section of the search result page and the plurality of hits in the second section of the search result page in response to the user edition.

4. The method of claim 1, further comprising:
re-ranking synchronously the newly annotated hit and the at least one annotated hit in the first section and the plurality of hits in the second section of the search result page in response to the new annotation.

5. The method of claim 1, further comprising:
removing synchronously one or more first annotated hits, from the first section of the search result page, that meet a pre-determined unfavorable rating;
removing synchronously one or more second annotated hits, from the second section of the search result page, that meet the predetermined unfavorable rating; and
re-displaying the search result page with a third button that allows the user to access the one or more first annotated hits and the one or more second annotated hits.

6. The method of claim 1, wherein the annotation view page comprises an overlay displayed over the search result page.

7. The method of claim 1, wherein the search result page is at least partially visible as the annotation view page is presented.

8. The method of claim 1, wherein the annotation view page comprises a third section that displays information retrieved from a database.

9. A system for responding to a user query, the system comprising:
at least one processor, storage, and a communication platform connected to a network, wherein the at least one processor is programmed to execute one or more instructions for:
receiving a search query from a user;
obtaining from a database, a plurality of hits relevant to the search query;
identifying from the plurality of hits, at least one annotated hit that was previously annotated by the user;
generating a search result page with a first section and a section, wherein:
the at least one annotated hit is presented within the first section with a first button that allows for the at least one annotated hit to be edited, and
the plurality of hits including the at least one annotated hit are presented within the second section, each of the plurality of hits being presented with a second button that allows a corresponding one of the plurality of hits to be edited;
presenting, in response to an activation of the second button associated with an unannotated hit, an annotated view page that allows the user to annotate the unannotated hit;
receiving a new annotation directed to an unannotated hit of the plurality of hits in response to an activation of the second button associated with the unannotated hit to generate a newly annotated hit; and
updating the search result page by inserting the newly annotated hit into the first section with the first button such that the at least one updated hit and the newly annotated hit are presented within the first section.

10. The system of claim 9, wherein the at least one annotated hit includes information related to the user's indication of favorability of the at least one annotated hit.

11. The system of claim 9, wherein the one or more instructions further comprising:
displaying, in response to the first button associated with the at least one annotated hit being activated, a first window for editing the at least one annotated hit;
receiving from the first interface, a user edition of information associated with the at least one annotated hit;
re-ranking synchronously the at least one annotated hit in the first section of the search result page and the plurality of hits in the second section of the search result page in response to the user edition.

12. The system of claim 9, wherein the one or more instructions further comprising:
re-ranking synchronously the newly annotated hit and the at least one annotated hit in the first section and the plurality of hits in the second section of the search result page in response to the new annotation.

13. The system of claim 9, wherein the one or more instructions further comprising:
removing synchronously one or more first annotated hits, from the first section of the search result page, that meet a pre-determined unfavorable rating;
removing synchronously one or more second annotated hits, from the second section of the search result page, that meet the predetermined unfavorable rating; and
re-displaying the search result page with a third button that allows the user to access the one or more first annotated hits and the one or more second annotated hits.

14. A non-transitory machine-readable medium having information recorded thereon for responding to a user query, wherein the information, when read by a machine, causes the machine to execute one or more computer program instructions for:
receiving a search query from a user;
obtaining from a database, a plurality of hits relevant to the search query;
identifying from the plurality of hits, at least one annotated hit that was previously annotated by the user;
generating a search result page with a first section and a second section, wherein
the at least one annotated hit is presented within the first section with a first button that allows for the at least one annotated hit to be edited, and
the plurality of hits including the at least one annotated hit are presented within the second section, each of the plurality of hits being presented with a second button that allows a corresponding one of the plurality of hits to be edited;
presenting, in response to an activation of the second button associated with an unannotated hit, an annotated view page that allows the user to annotate the unannotated hit;
receiving a new annotation directed to an unannotated hit of the plurality of hits in response to an activation of the second button associated with the unannotated hit to generate a newly annotated hit; and
updating the search result page by inserting the newly annotated hit into the first section with the first button such that the at least one annotated hit and the newly annotated hit are presented within the first section.

15. The non-transitory machine-readable medium of claim 14, wherein the at least one annotated hit includes information related to the user's indication of favorability of the at least one annotated hit.

16. The non-transitory machine-readable medium of claim 14, wherein the one or more instructions, when read by the machine, causes the machine to execute the one or more computer program instructions for:

displaying, in response to the first button associated with the at least one annotated hit being activated, a first window for editing the at least one annotated hit;

receiving from the first interface, a user edition of information associated with the at least one annotated hit;

re-ranking synchronously the at least one annotated hit in the first section of the search result page and the plurality of hits in the second section of the search result page in response to the user edition.

17. The non-transitory machine-readable medium of claim 14, wherein the one or more instructions further comprising:

re-ranking synchronously the newly annotated hit and the at least one annotated hit in the first section and the plurality of hits in the second section of the search result page in response to the new annotation.

18. The non-transitory machine-readable medium of claim 14, wherein the one or more instructions further comprising:

removing synchronously one or more first annotated hits, from the first section of the search result page, that meet a pre-determined unfavorable rating;

removing synchronously one or more second annotated hits, from the second section of the search result page, that meet the predetermined unfavorable rating; and re-displaying the search result page with a third button that allows the user to access the one or more first annotated hits and the one or more second annotated hits.

* * * * *